United States Patent [19]

Hayn, II et al.

[11] Patent Number: 4,631,659
[45] Date of Patent: Dec. 23, 1986

[54] MEMORY INTERFACE WITH AUTOMATIC DELAY STATE

[75] Inventors: John Hayn, II, Midland; John Schabowski, Houston, both of Tex.

[73] Assignee: Texas Instruments Incorporated, Dallas, Tex.

[21] Appl. No.: 718,584

[22] Filed: Apr. 1, 1985

Related U.S. Application Data

[63] Continuation of Ser. No. 587,335, Mar. 8, 1984, abandoned.

[51] Int. Cl.[4] .............................................. G06F 13/38
[52] U.S. Cl. .................................................... 364/200
[58] Field of Search ... 364/200 MS File, 900 MS File; 365/194

[56] References Cited

U.S. PATENT DOCUMENTS 3,818,459  6/1974  Vrablik .............................. 364/200
4,040,027  2/1977  van Es et al. ...................... 364/900
4,047,245  9/1977  Knipper ............................. 364/200
4,095,265  6/1978  Vrba ................................. 364/200
4,112,490  9/1978  Pohlman et al. ................... 364/200
4,435,757  3/1984  Pross, Jr. ........................... 364/200

Primary Examiner—Thomas M. Heckler
Attorney, Agent, or Firm—Robert D. Marshall, Jr.; N. Rhys Merrett; Melvin Sharp

[57] ABSTRACT

A digital processor system that includes a processor interface to an external memory. The interface to the external memory includes an information transfer bus to transfer information between the processor and the external memory and control circuitry to regulate the information on the information bus. This control circuitry includes the capability to delay the reading of information on the memory in order to allow for memory accesses to a slow memory. This delay capability is a selectable feature that is selected upon initialization of the processor.

5 Claims, 35 Drawing Figures

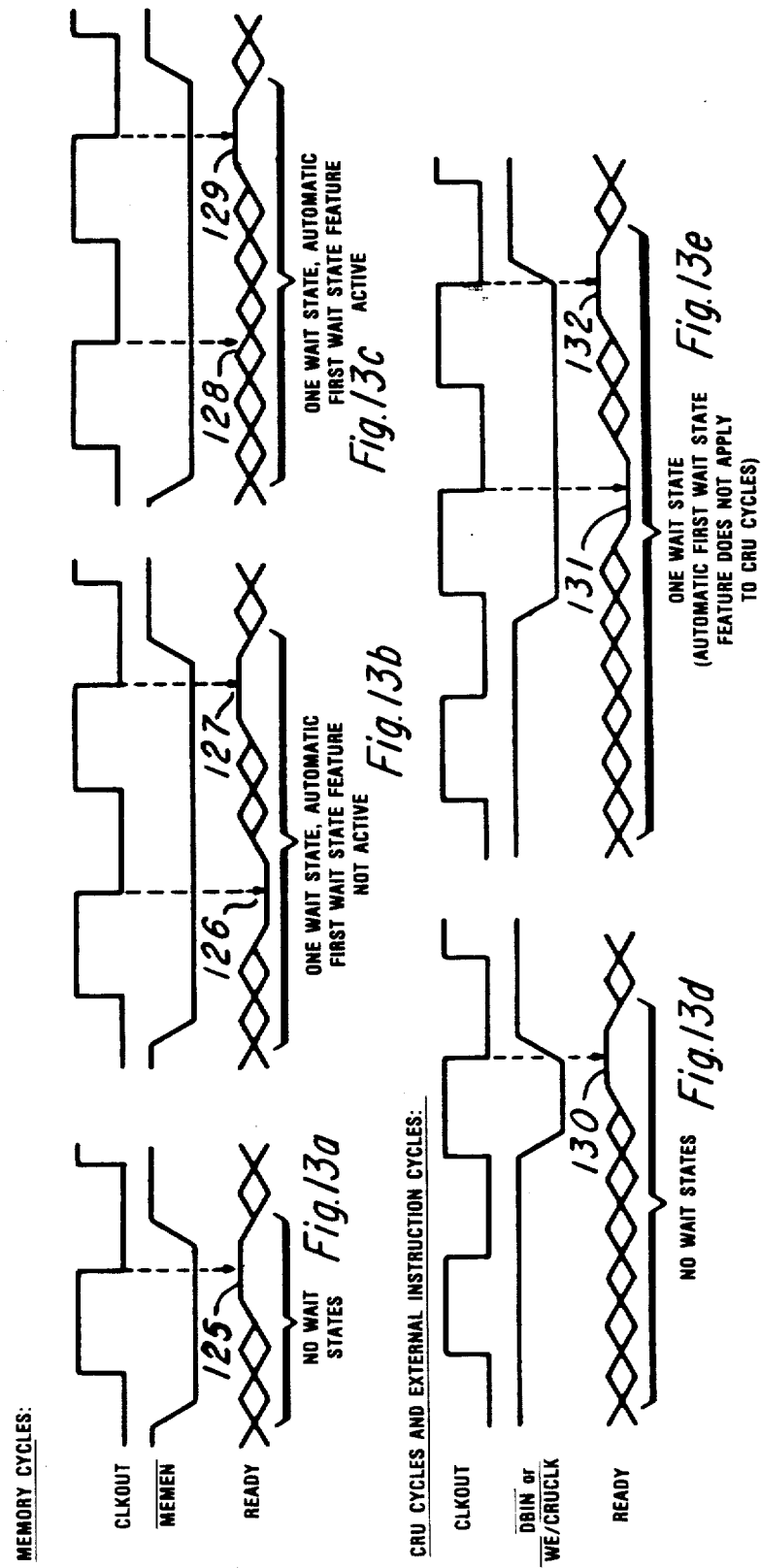

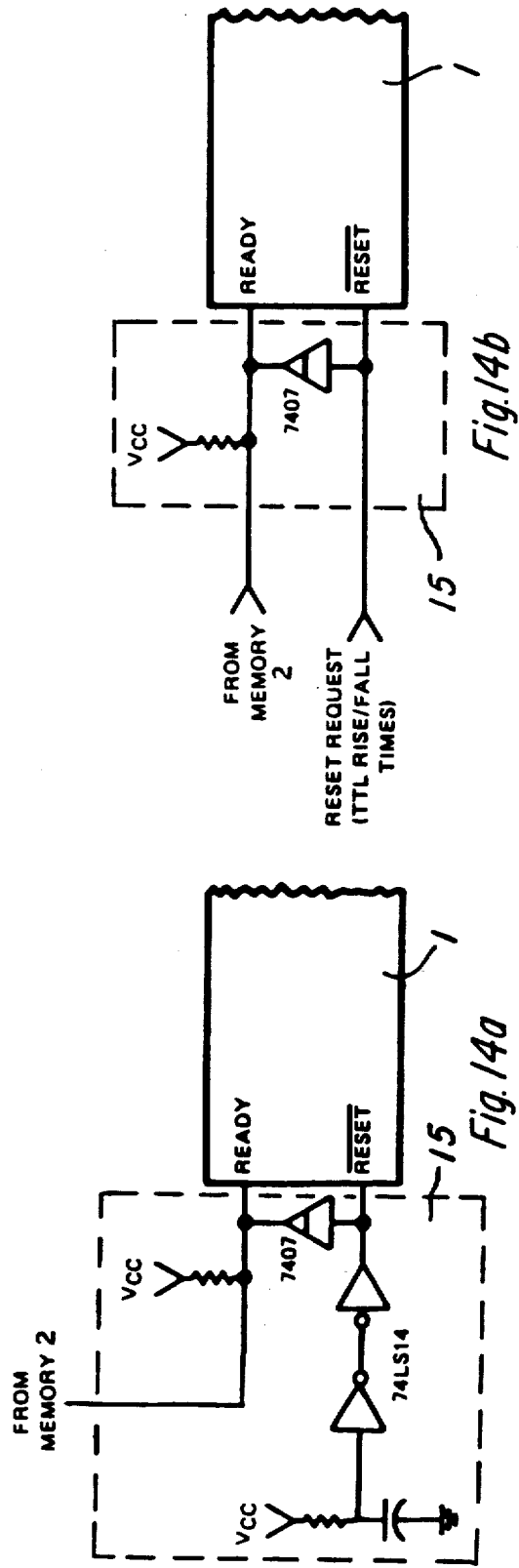

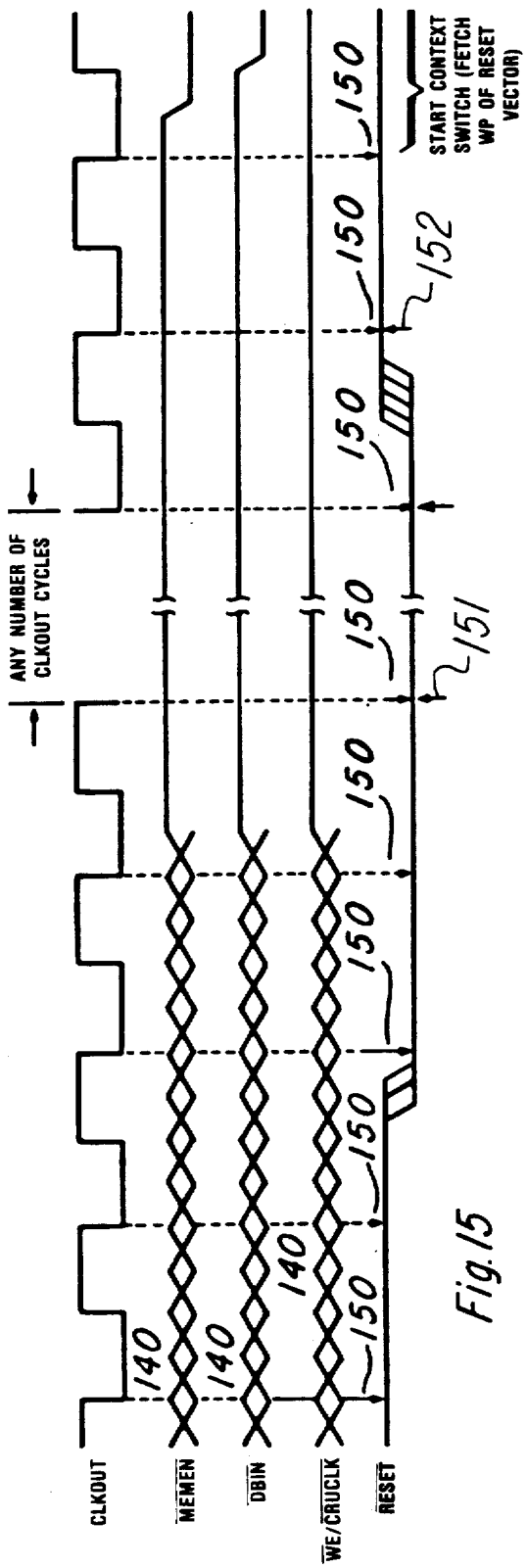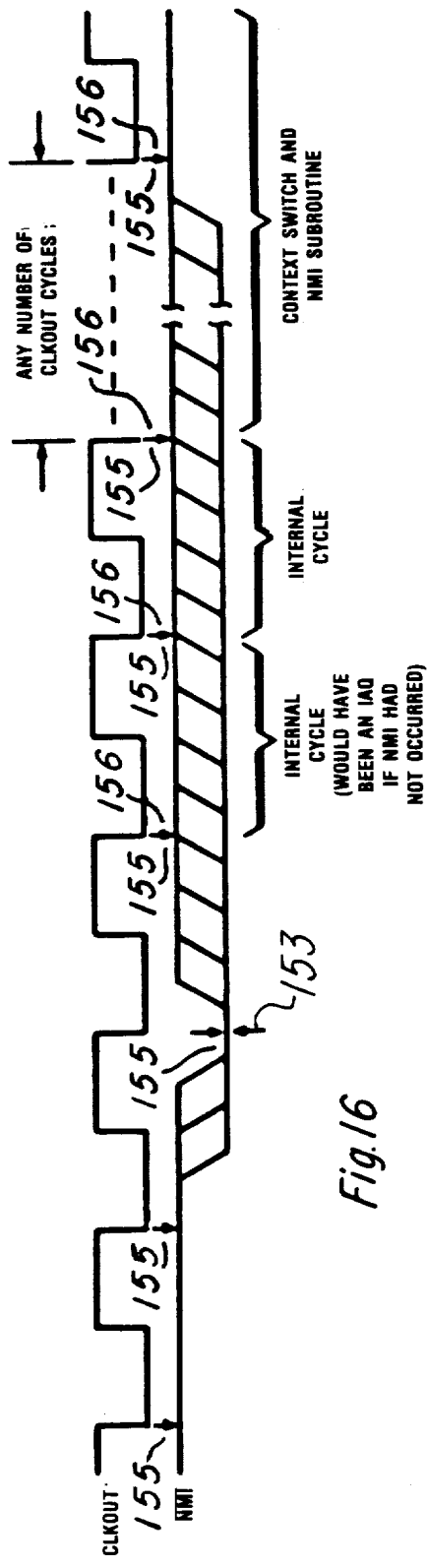
Fig.15
Fig.16

MEMORY INTERFACE WITH AUTOMATIC DELAY STATE

This is a continuation of application Ser. No. 587,335, filed Mar. 8, 1984, now abandoned.

BACKGROUND

1. Field of the Invention

This invention relates to computer memory interfaces, digital computers and electronic data processing systems.

2. Description of Prior Art

Digital processor systems ordinarily include a central processing unit with a memory. In microcomputer applications the program memory is contained on the same chip as the central processing unit. However, in larger microcomputer systems the program memory may be implemented on an external memory system set of chips and interfaced over an input/output line to the microcomputer chip containing the central processing unit. In digital processing systems requiring external memory, the interface between the memory chip and the central processing unit chip may be accomplished with either a hand shaking technique, i.e., the CPU chip sends a request over I/O line, then answered by the memory chip over the same I/O line before the transfer was actually implemented, or the transfer is synchronous, that is, the central processing unit request memory access and then at a certain set time, read the data that is available on the input/output lines from the external memory system. Using a synchronous interface to an external memory saves time and improves the performance of the microcomputer system. However, the information from the external memory must be available on the input/output data lines when the central processing unit chip expects to read the data. Problems arise when different external memory systems are used with the same microcomputer chip set since the external memory systems may and most probably do have different access time requirements. If the external memory system is faster than is required by the microprocessor system, then there is no problem if the external memory system can hold the data on the input/output lines until read. However, if the external memory system is slower than the microprocessor or microcomputer system, then errors may occur when the microcomputer or system attempts to read the data on the input/output bus since there is no guarantee that the data on the bus at the time it is read is the data that is being accessed from the external memory system. This invention solves the foregoing problem by providing an external memory interface for a microcomputer system that provides an automatic wait time to allow slower external memory systems to interface to the microcomputer system.

SUMMARY OF THE INVENTION

In accordance with the present invention, a digital processor system is provided that includes a processor interface to an external memory through an information bus. The information bus includes information transfer lines to transfer information between the processor and the external memory and control capability that regulates the transfer of information over the information bus. This control capability includes the capability to delay the reading and writing of the information bus by the processor during a memory cycle.

BRIEF DESCRIPTION OF THE DRAWINGS

FIG. 13a is a timing diagram of the Wait state for external memory cycles showing the timing for a No-Wait state condition.

FIG. 13b is a timing diagram for the external memory showing one Wait state without any automatic first Wait state condition.

FIG. 13c is a timing diagram of the interface to an external memory showing an automatic Wait state.

FIG. 13d is a timing diagram for the communications register unit showing no Wait states.

FIG. 13e is a timing diagram for the communication register unit showing one Wait state.

FIG. 14a is a diagram of the external circuitry required to inhibit an automatic first Wait state.

FIG. 14b is a diagram of the external circuitry for inhibiting the automatic first Wait state using TTL speed reset request.

FIG. 14c is a diagram of the external circuitry for invoking the automatic first Wait state.

FIG. 15 is a diagram of the reset signal timing relationship for the processing unit.

FIG. 16 is a diagram of the non-maskable interrupt signal timing.

DESCRIPTIVE EMBODIMENT OF THE INVENTION

Figure 1:
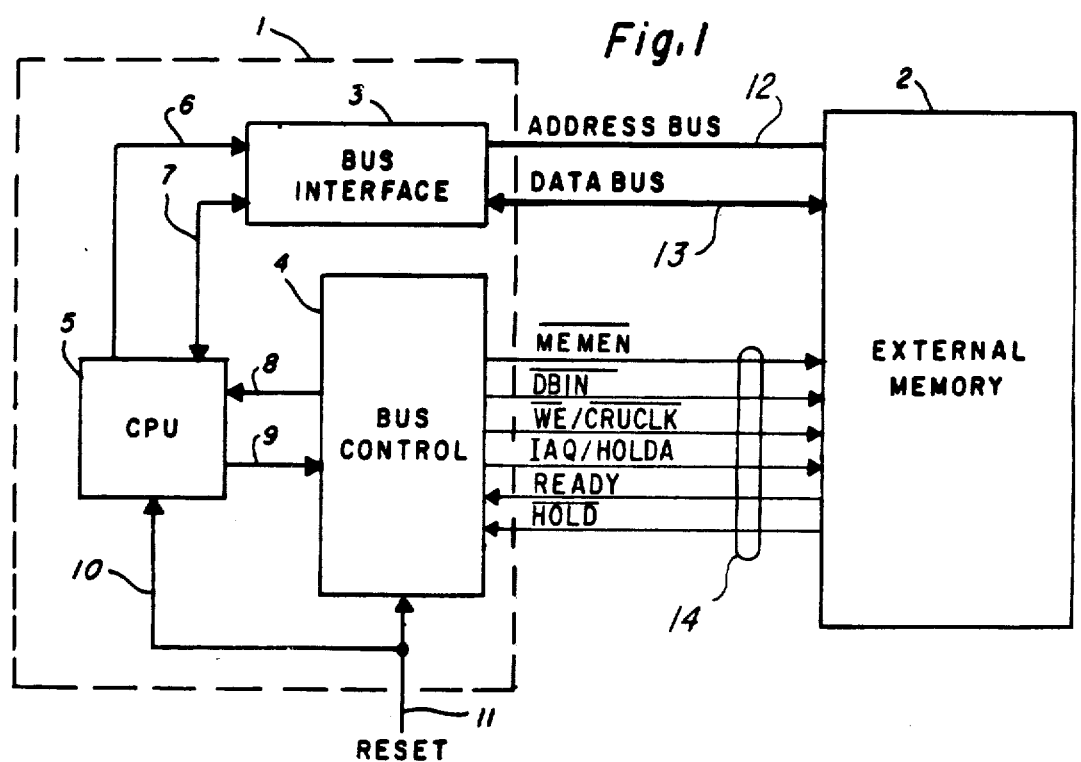
FIG. 1 is a block diagram of a digital processing system including a processing unit interfaced to an external memory.

FIG. 1 represents a processing system including a processor 1, connected to an external memory 2. The interface between the processor 1 and external memory 2 is an address bus 12 that provides the address of data contained in the extended memory 2, a data bus that allows the processor 1 to write into the external memory 2 or to read from the external memory 2 and seven control signals 14. The processor 1 includes a bus interface 3 that provides transmitting capabilities for the address bus and is connected to CPU 5 via line 6 in order to receive the address information from CPU 5. In addition, bus interface 3 receives data information from CPU 5 via line 7 and transmits or receives this information to the external memory 2 via the data bus 13. Bus controller 4 is interfaced to CPU 5 through lines 9 and 8. Lines 9 provides the outgoing control to the external memory 2. Line 8 provides the external memory ready signal to the CPU 5. The reset signal used to initialize the CPU is also input into both the bus control 4 and the CPU 5 via lines 11 and 10. The reset signal is used to initialize the CPU 5 and also to define the auto wait state condition in the bus controller 4.

FIG. 4 illustrates the memory map for processor 1. Shown are the locations in the memory address space for the reset signal, a nonmaskable interrupt signal, other interrupts and the XOP trap vectors, and a dedicated address segments for the on-chip RAM and the on-chip memory mapped input/output. An XOP is a software interrupt.

Figure 3:
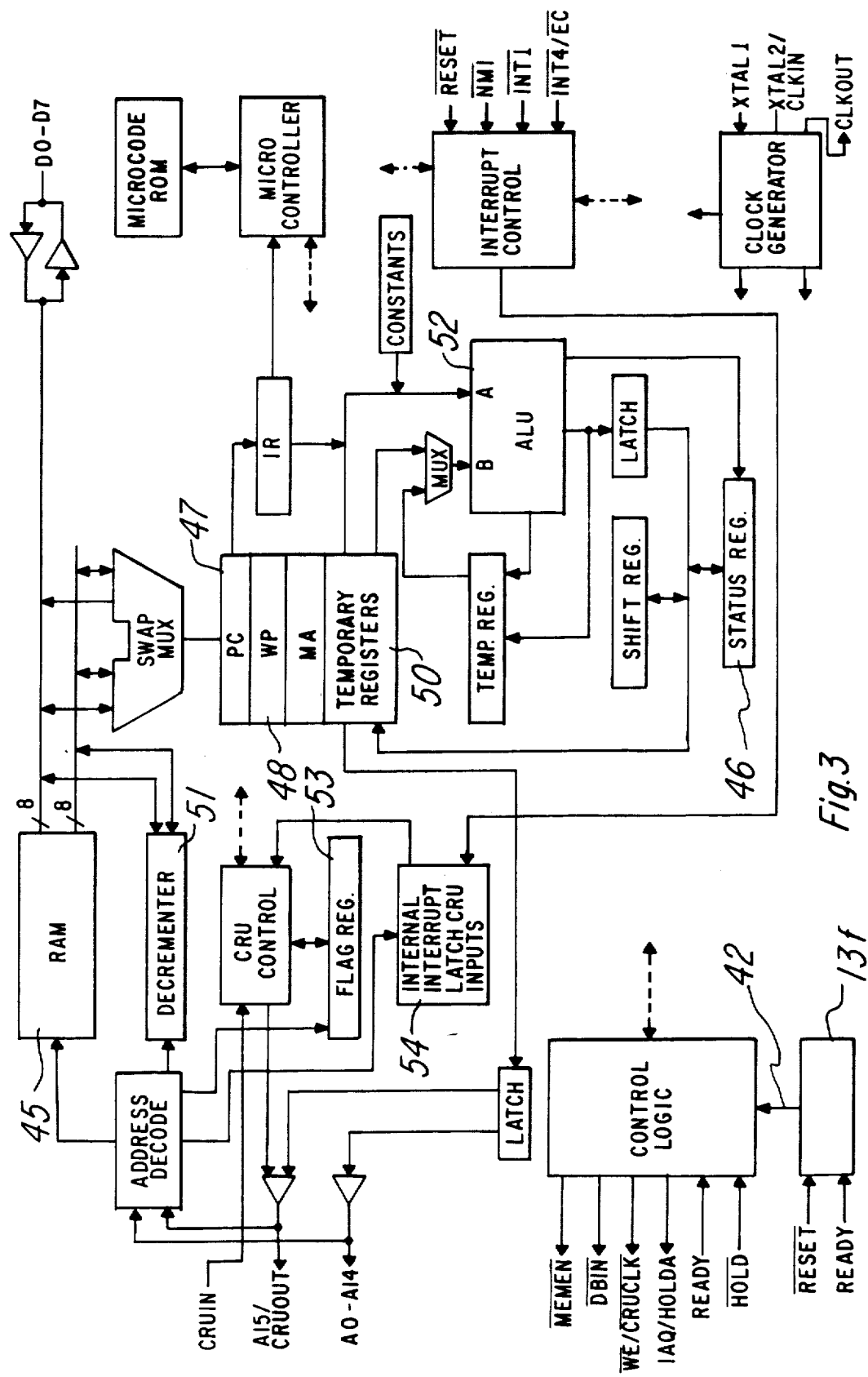
FIG. 3 is a block diagram of the processing unit.
Figure 4A:
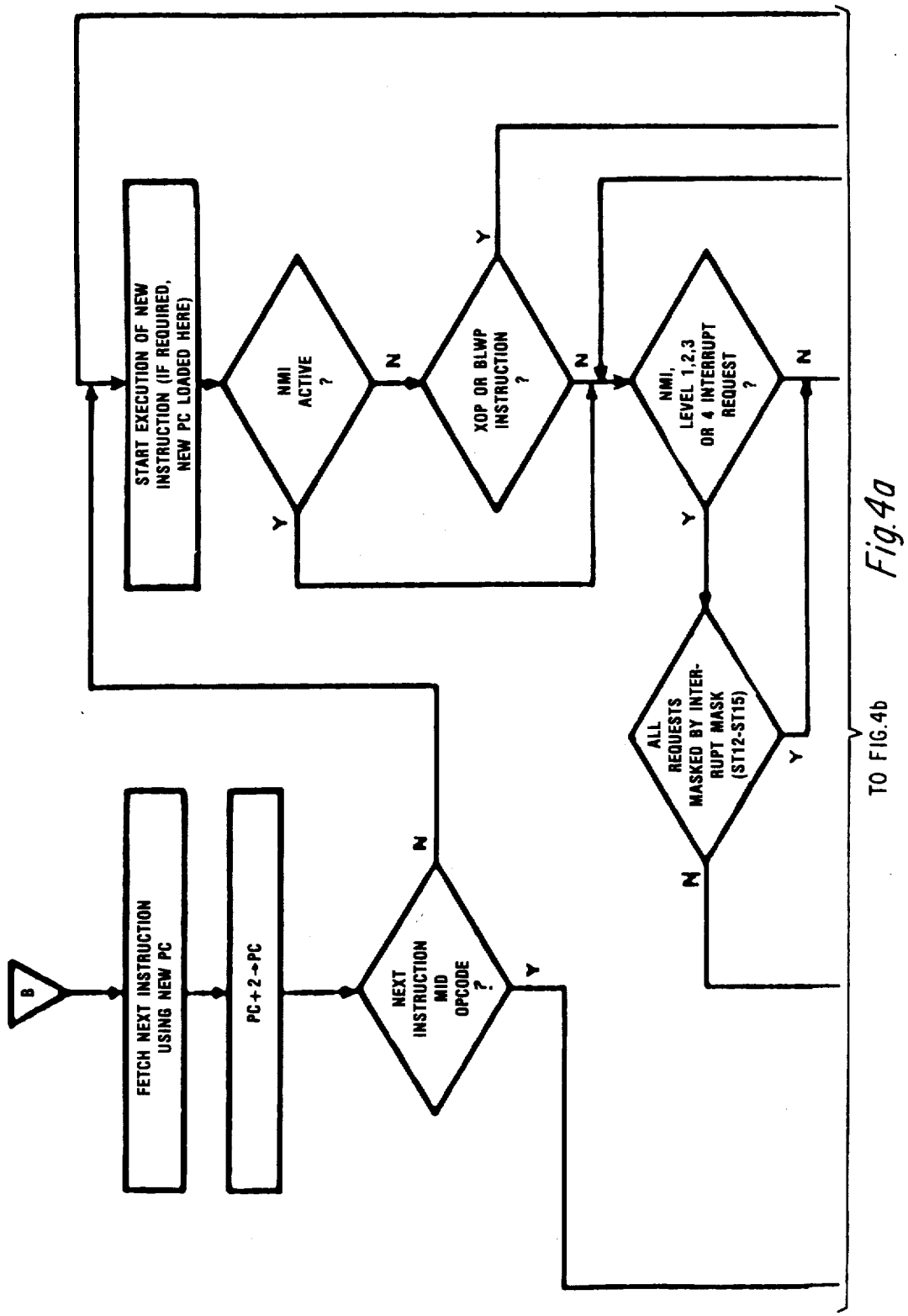
FIGS. 4a–4f are a flow chart illustrating the internal operations of the processing unit.
Figure 4B:
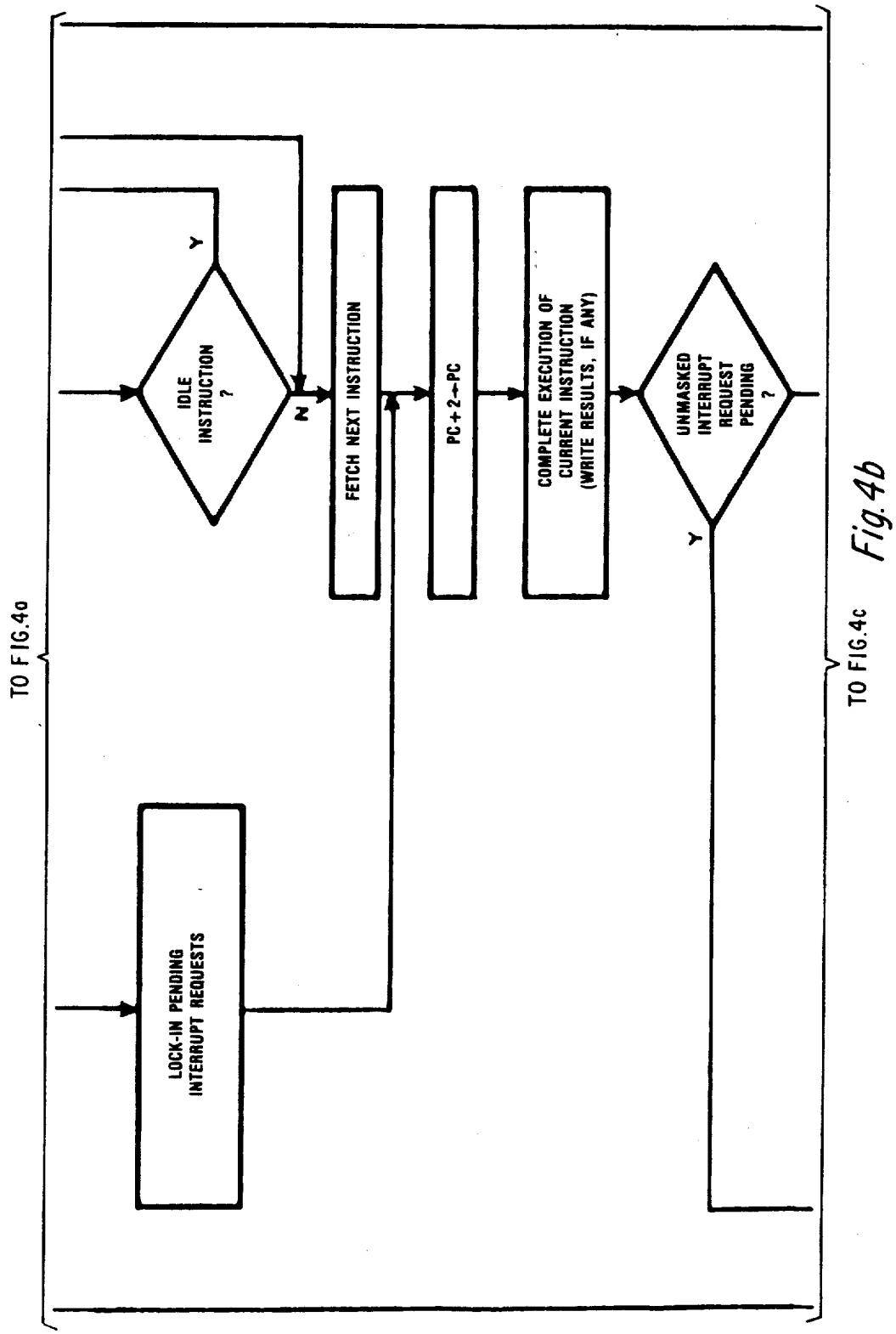
Figure 4C:
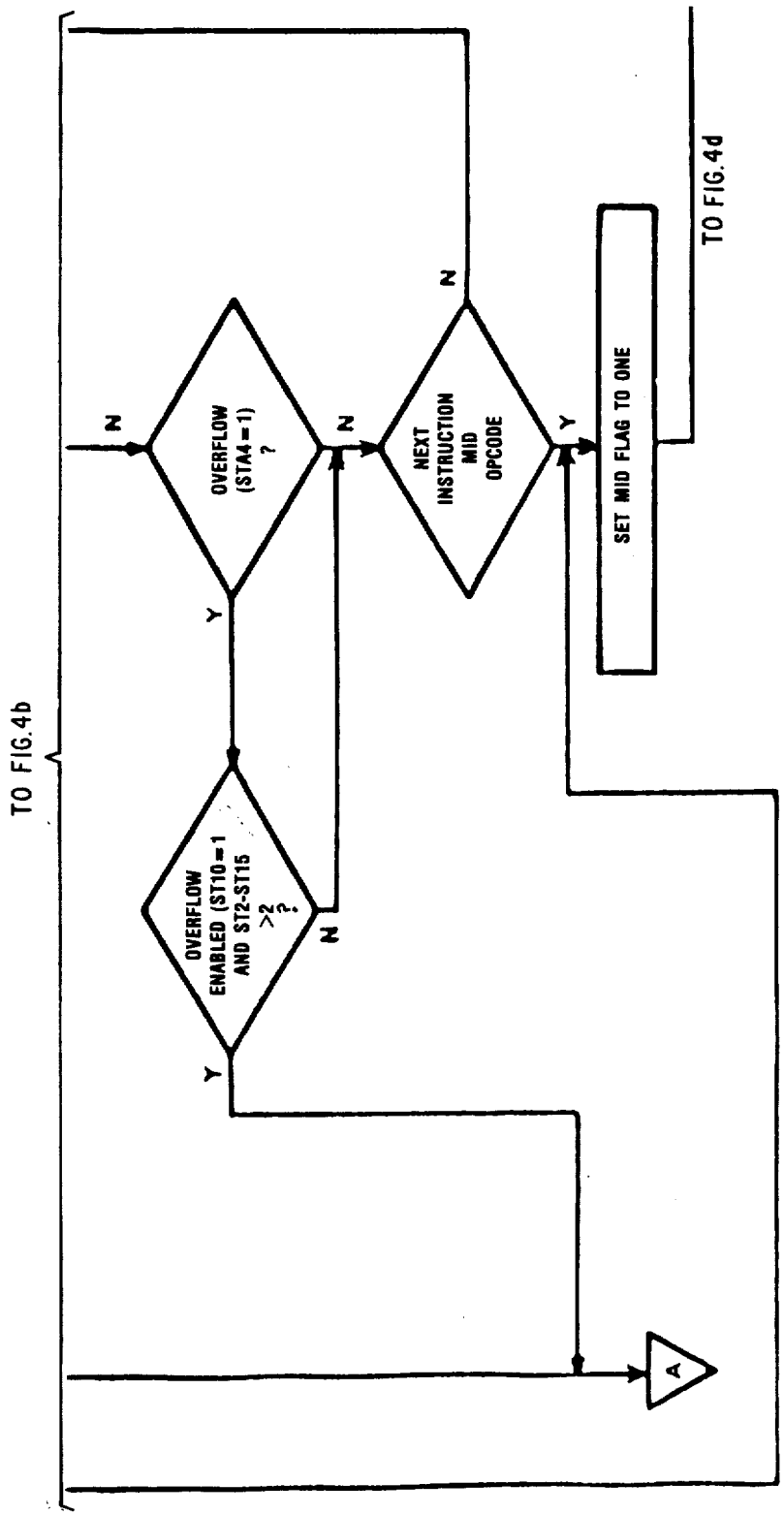
Figure 4D:
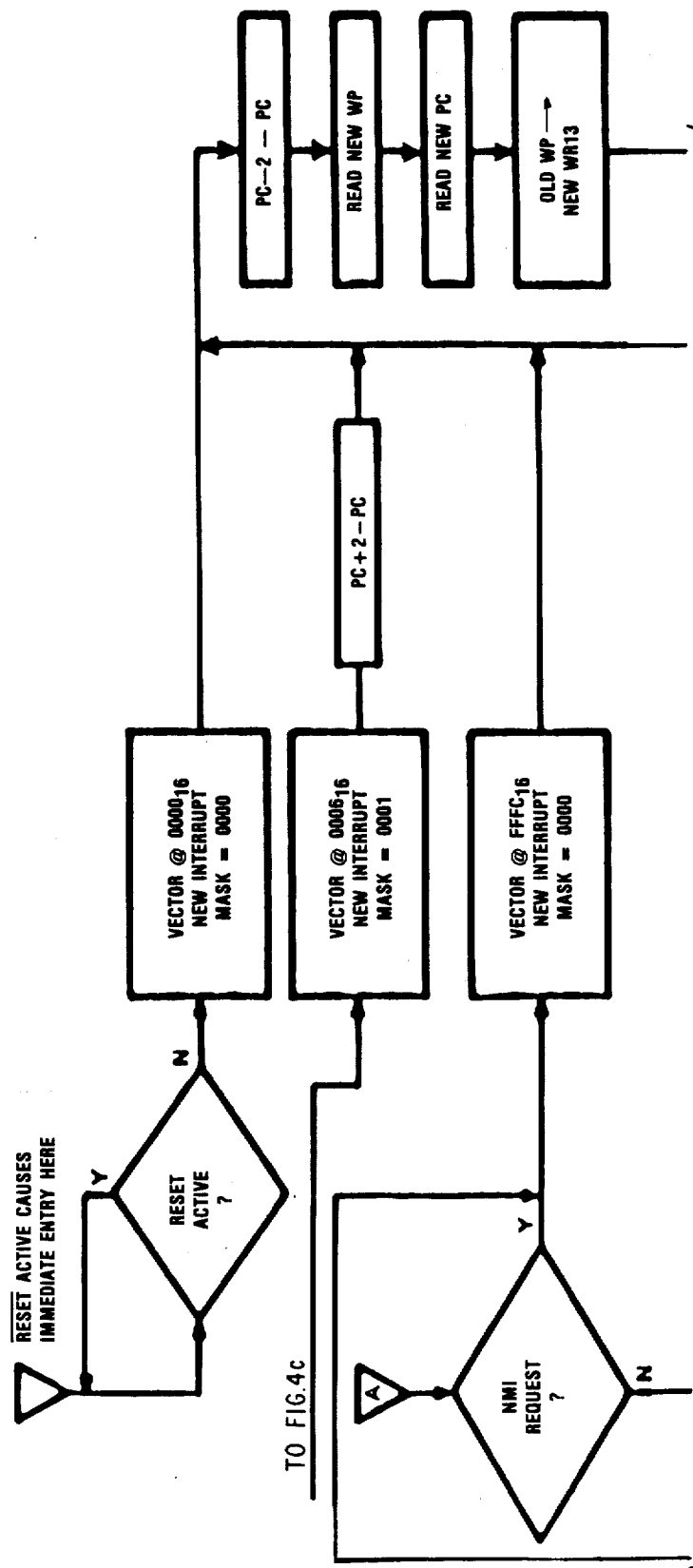
Figure 4E:
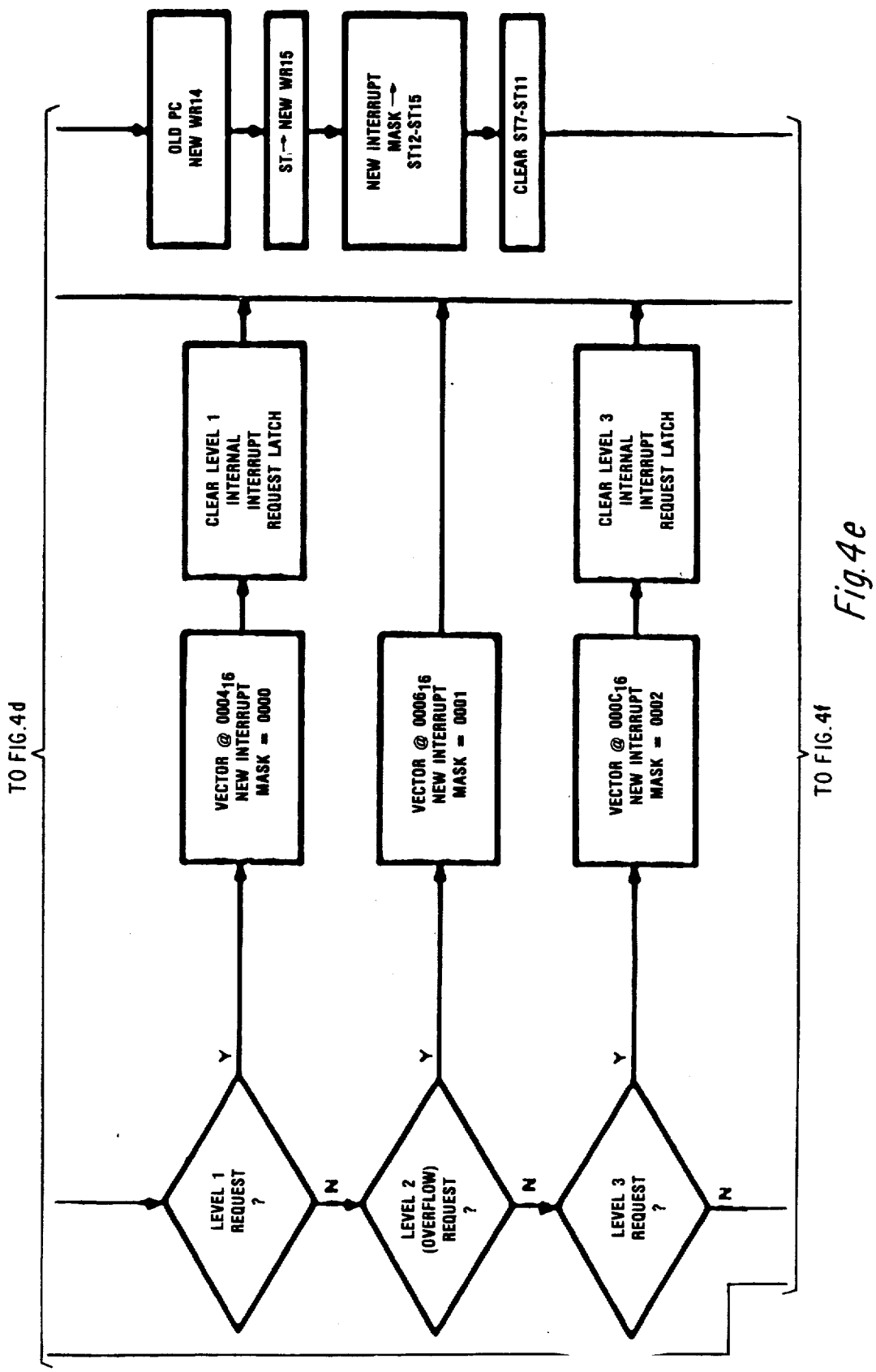
Figure 4F:
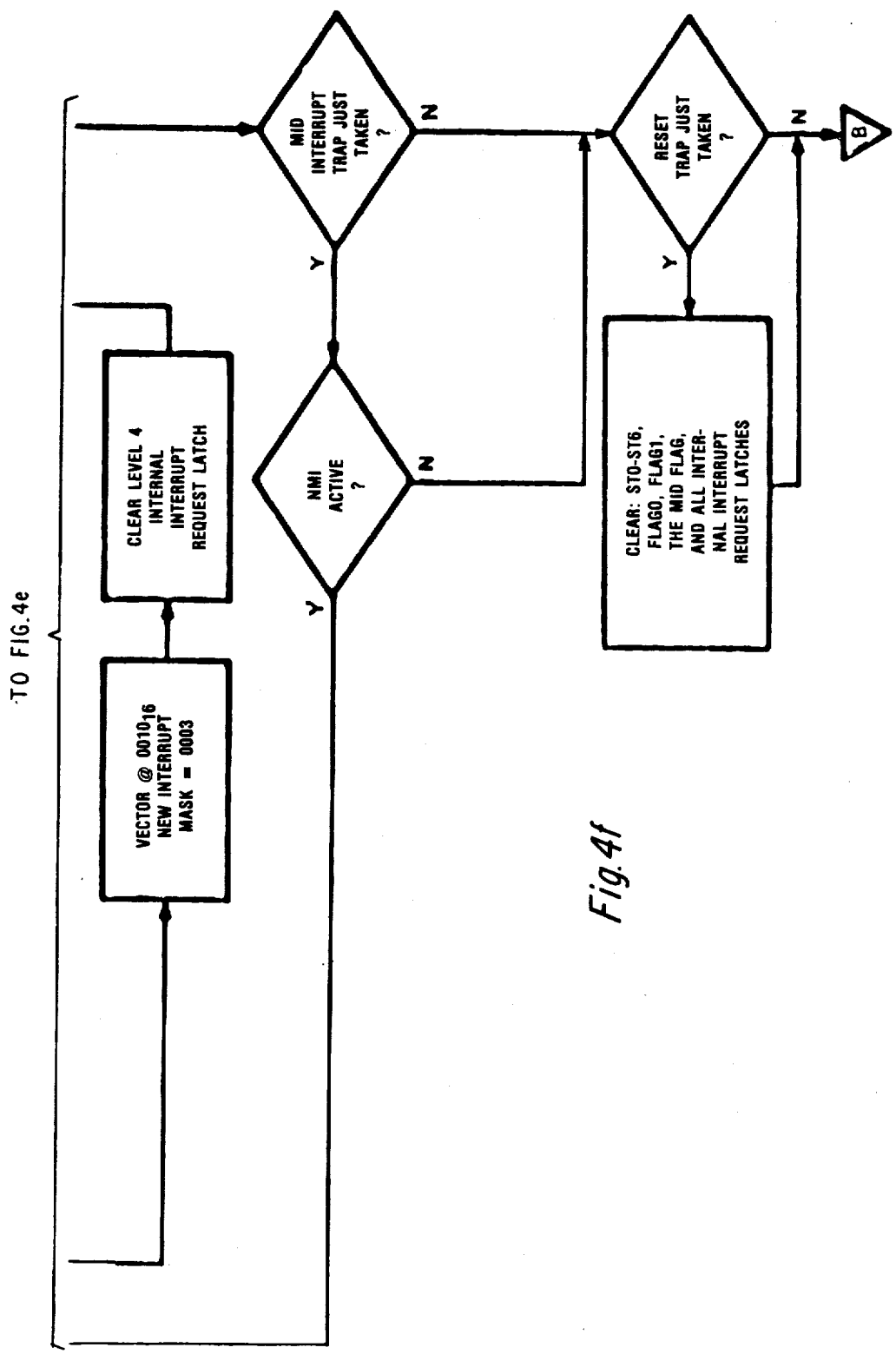

The block diagram of the Processor 1 is shown in FIG. 3. A flow chart, representative of the Processor 1 functional operation, is shown in FIGS. 4a-4f.

Arithmetic Logic Unit

An arithmetic logic unit (ALU) 52 is the computational component of the Processor 1. It performs all arithmetic and logic functions required to execute instructions. The functions include addition, substraction, AND, OR, exclusive OR, and complement. The ALU 52 is arranged in two 8-bit halves to accommodate byte operations. Each half of the ALU 52 operates on one byte of the operand. During word operand operations, both halves of the ALU 52 function in conjunction with each other. However, during byte operand processing, results from the least significant half of the ALU 52 are ignored. The most significant half of the ALU 52 performs all operations on byte operands so that the status circuitry used in word operations is also used in byte operations.

Internal Registers

The following three (3) internal registers are accessible to the user (programmer):
Program Counter (PC) 47
Status Register (ST) 46
Workspace Pointer (WP) 48

Program Counter

The program counter (PC) 47 is a 15-bit counter that contains the word address of the next instruction following the instruction currently executing. The processor 1 references this address to fetch the next instruction from memory and increments the address in the PC 47 when the new instruction is executing. If the current instruction in the processor 2 alters the contents of PC 47, then a program branch occurs to the location specified by the altered contents of PC 47. All context switching operations plus simple branch and jump instructions affect the contents of PC 47.

Status Register

Figure 5:
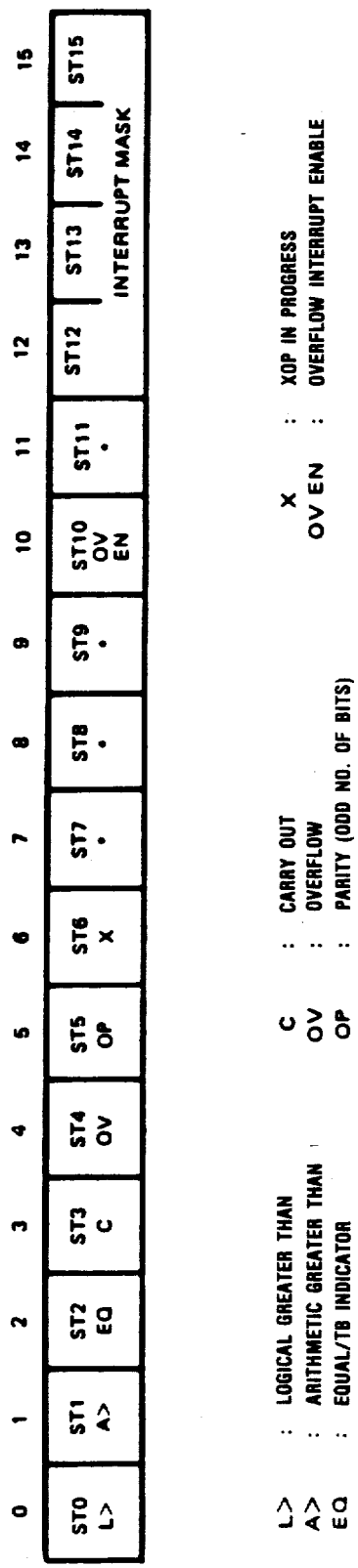
FIG. 5 is a diagram of the status register bit assignments.

The status register (ST) 46 is a fully implemented 16-bit register that reports the results of program comparisons, indicates program status conditions, and supplies the arithmetic overflow enable and interrupt mask level to the interrupt priority circuits. Each bit position in the register signifies a particular function or condition that exists in the processor. FIG. 5 illustrates the bit position assignments. Some instructions use the status register 46 to check for a prerequisite condition; others affect the values of the bits in the register; and others load the entire status register with a new set of parameters. Interrupts also modify the status register 46.

Workspace

Figure 6:
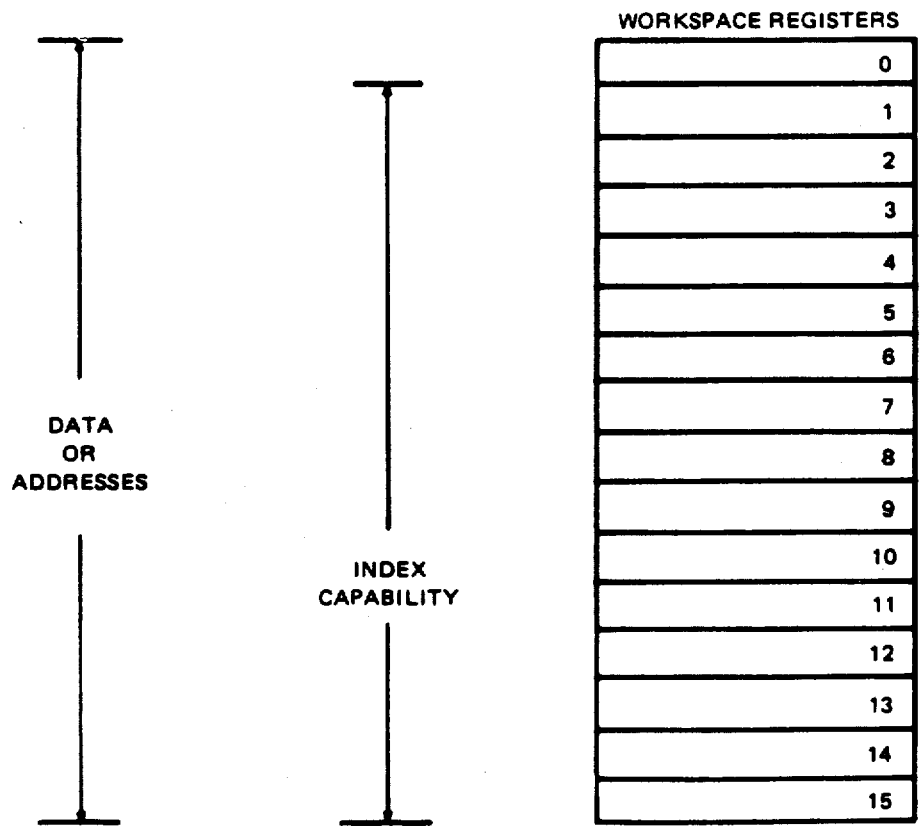
FIG. 6 is a diagram of the workspace registers that are usable as index registers.

The processor 1 uses blocks of memory words called workspaces for instruction operand manipulation. A workspace occupies 16 contiguous words in any part of memory that is not reserved for other use. The individual workspace registers may contain data or address, or function as operand registers, accumulators, address reigsters, or index registers. Some workspace registers take on special significance during execution of certain instructions. Table 1 lists each of these dedicated workspace registers and the instructions that use them. FIG. 6 defines the workspace registers that are allowed to be used as index registers.

Workspace Pointer

Figure 7:
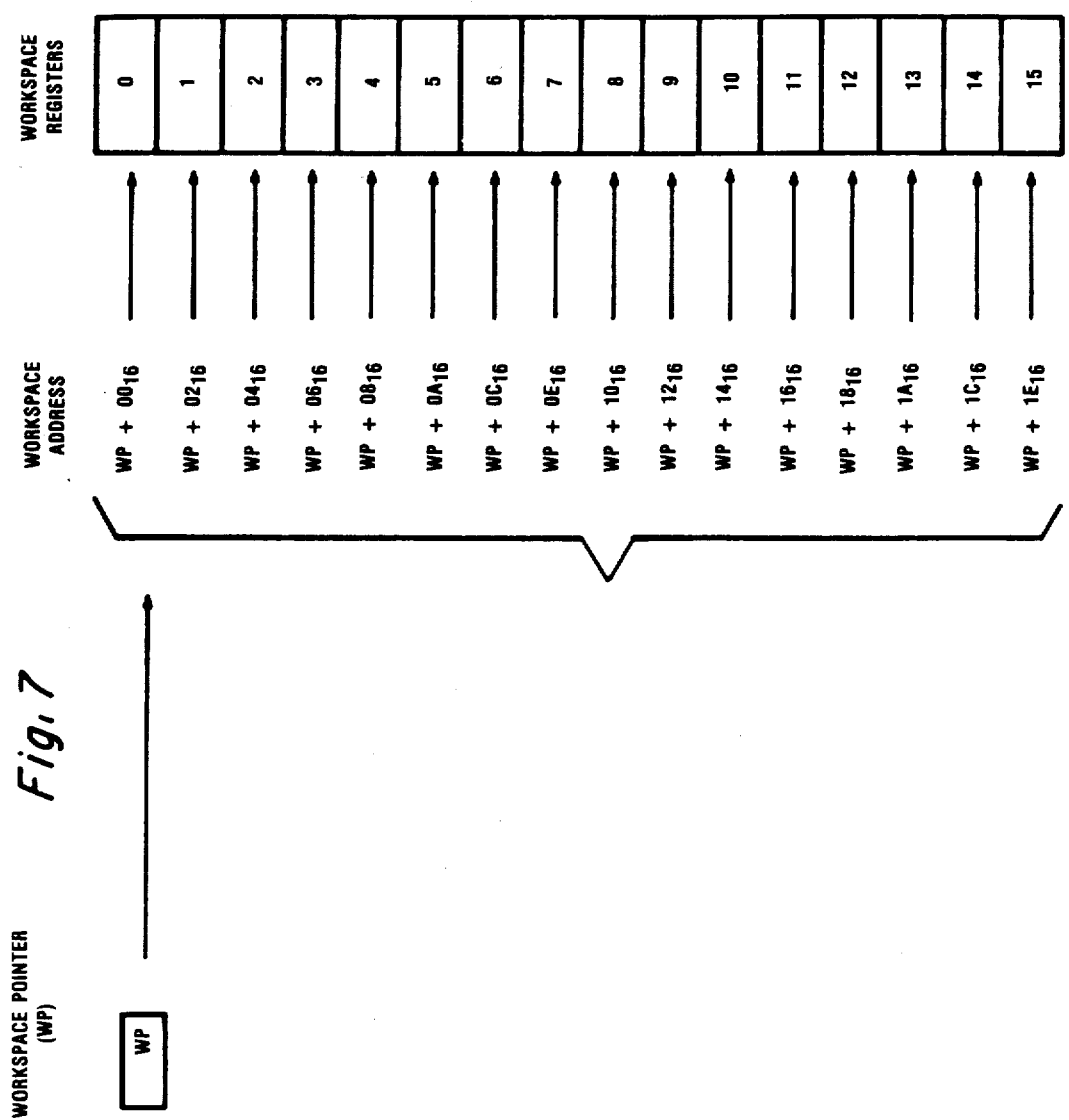
FIG. 7 is a diagram of the workspace pointer and registers.

To locate the workspace in memory, a hardware register called the workspace pointer (WP) 48 is used. The workspace pointer 48 is a 16-bit register that contains the memory address of the first word in the workspace. The address is left-justified with the 16th bit (LSB) hardwired to logic zero. The processor 1 accesses each register in the workspace by adding twice the register number to the contents of the workspace pointer 48 and initiating a memory request for that word. FIG. 7 illustrates the relationship between the workspace pointer and its corresponding workspace in memory. It should be noted that the Processor 1 adds the workspace pointer (WP) 48 to twice the register number to derive actual register addresses. For instructions performing byte operations, use of the workspace register addressing mode will result in the most significant byte of the workspace register 48 involved to be used as the operand for the operation. Since the workspace is also addressable as a memory address, the least significant byte may be directly addressed using any one of the general memory addressing modes.

Context Switching

The workspace concept is particularly valuable during operations that require a context switch, which is a change from one program environment to another, as in the case of a subroutine or an interrupt service routine. Such an operation using a conventional multi-register arrangement requires that at least part of the contents of the register file be stored and reloaded using a memory cycle to store or fetch each word. The processor 1 accomplishes this operation by changing the workspace pointer 48. A context switch requires only three store cycles and two fetch cycles, exchanging the program counter 47, status register 46 and workspace pointer 48. After the switch, the workspace point 48 contains the starting address of a new 16-word workspace in memory for use in the new routine. A corresponding time saving occurs when the original context is restored. Instructions in the processor 1 that result in a context switch include: Call subroutine (BLWP), Return from Subroutine (RTWP) and the Extended Operation (XOP) instruction. All interrupts also cause a context switch by forcing the processor 1 to trap to a service subroutine.

External Memory Interface

Figure 8:
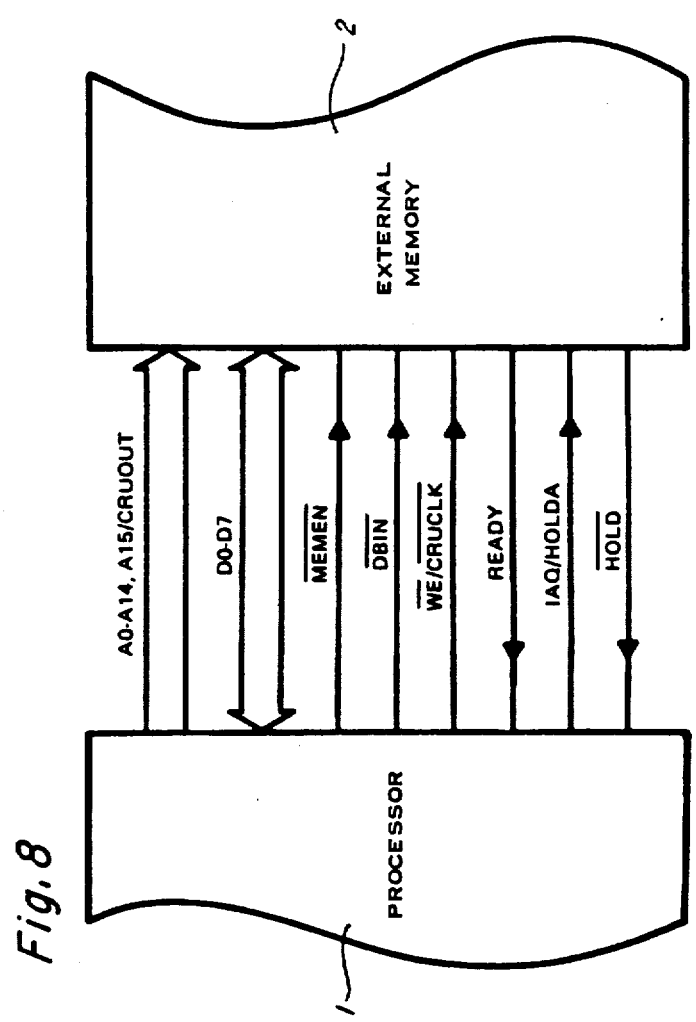
FIG. 8 is a diagram of the signal interface between the processing unit and external memory.

The signals used in the processor interface to external memory 2 are shown in FIG. 8. IAQ/HOLDA and HOLD— are not required for simple memory systems, but will be used by DMA controllers.

Memory Read Operations

Figure 9:
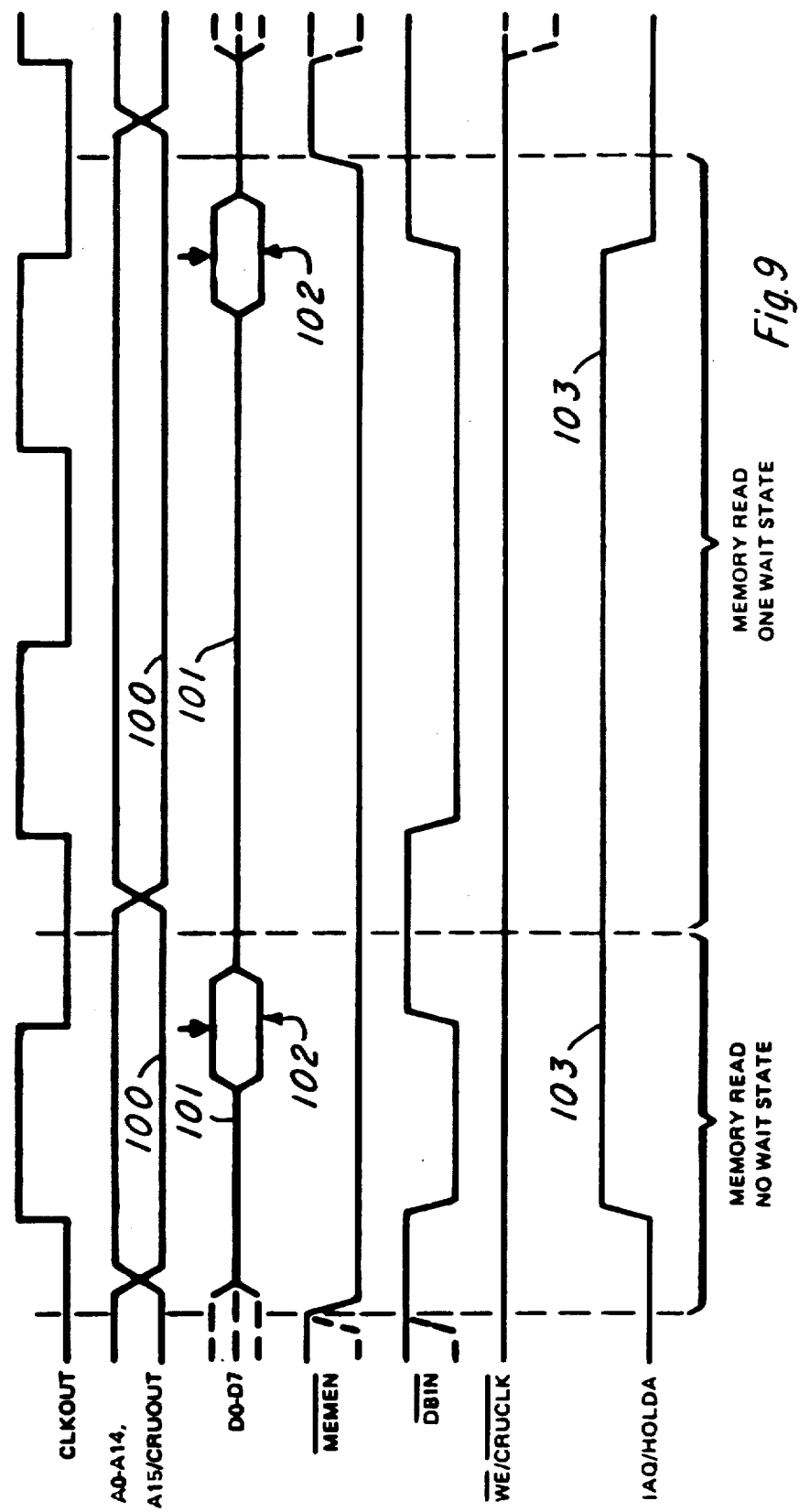
FIG. 9 is a timing diagram of a memory read cycle for the external memory interface.

To perform a memory read operation, the processor 1 first outputs the appropriate address an A0–A14 and A15/CRUOUT, and asserts MEMEN—. The processor 1 then places its data bus drivers in the high impedance state, asserts DBIN—, and then reads in the data byte. Completion of the memory read cycle and/or generation of Wait states is determined by the READY input. Timing relationships of the memory read sequence are shown in FIG. 9. Note that MEMEN— remains active (low) between consecutive memory operations.

Although not explicitly shown in FIG. 9, reading a word (two 8-bit bytes) from external memory requires two memory read cycles that occur back-to-back (a Hold state request will not be granted between cycles). If an instruction directs that a byte read operation from external memory is to be performed, only the byte specifically addressed will be read (one memory read cycle). External words are accessed most-significant (even) byte first, followed by the least-significant (odd) byte. A valid address is present on the A0 to A7, A15/-CRUOUT address bus at 100. The processor 1 then awaits the data transmission from external memory 2 which is illustrated at 102. The data at 102 must be valid at the fall of the CLKOUT edge. IAQ/HOLDA (103 in FIG. 9) will only be asserted during memory read cycles if an instruction OP code is being read. During memory read cycles in which an instruction opcode is being read. IAQ/HOLDA is asserted as shown in FIG. 9. Note that since an instruction opcode is a word in length, IAQ/HOLDA remains asserted between the two byte read operations involved when an instruction opcode is read from the external memory address space.

Memory Write Operations

Figure 10:
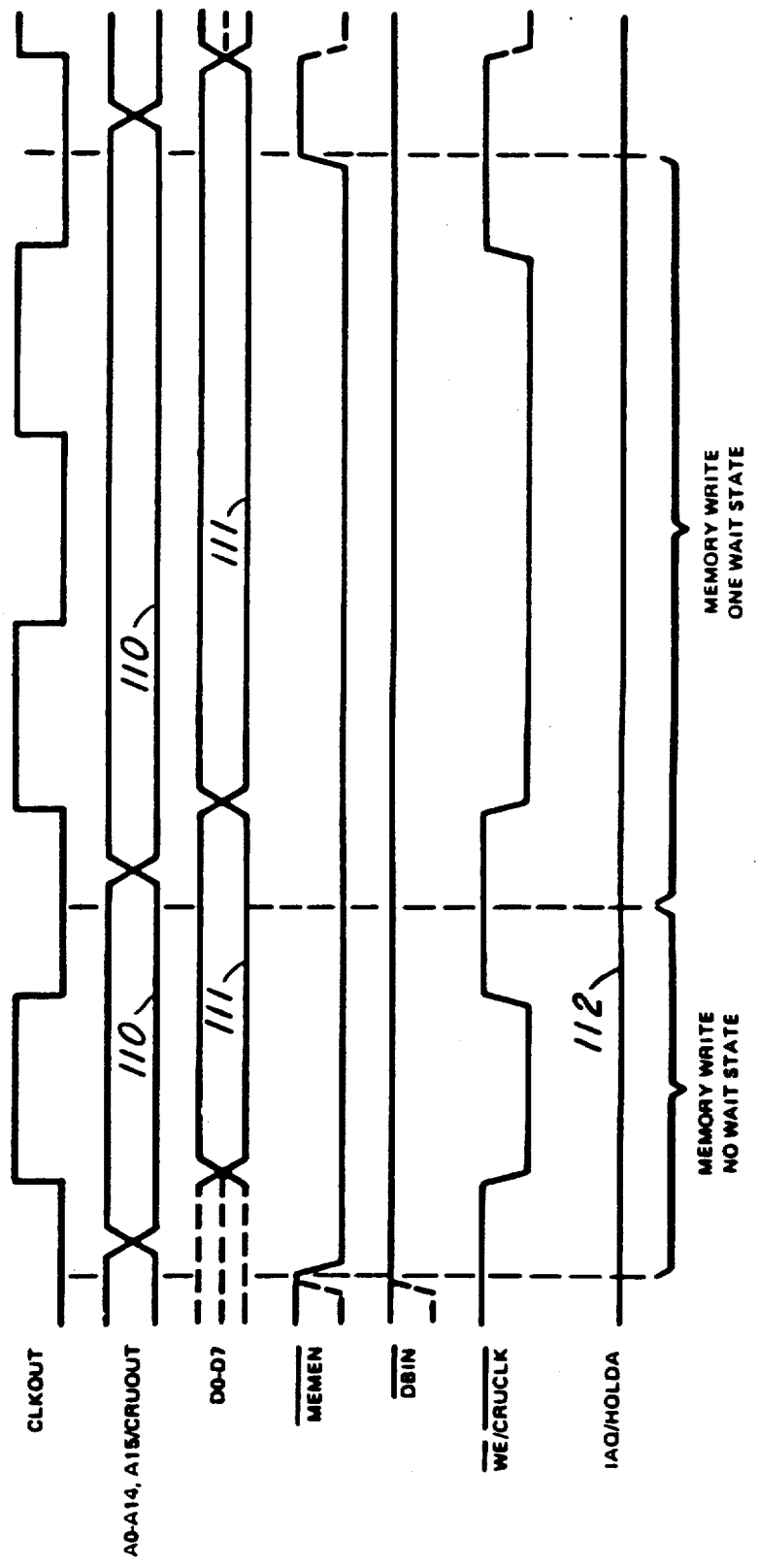
FIG. 10 is a timing diagram for the external memory WRITE cycle.

To perform a memory write operation, the processor 1 first outputs the appropriate address on A0–A14 and A15/CRUOUT, and asserts MEMEN—. The processor 1 then outputs the data byte being written to memory on pins D0 through D7, and then asserts WE—/-CRUCLK—. Completion of the memory write cycle and/or generation of Wait states is determined by the Ready input. Timing relationships of the memory write sequence are shown in FIG. 10. A valid address is present at 110 on the A0–A14, A15/CRUOUT address bus. On the data bus D0 to D7, valid memory write data is present at 111. Note that IAQ/HOLDA (112 in FIG. 10) will never be asserted during a memory cycle. Note that MEMEN remains active (low) between consecutive memory operations. Writing a word (two 8-bit bytes) to the external memory 2 requires two memory write cycles that occur back-to-back. (A Hold state request will not be granted between cycles.) If an instruction directs that a byte write to external memory 2 is to be performed, only the byte specifically addressed will be written (one memory write cycle). External words are accessed most-significant (even) byte first followed by the least-significant (odd) byte.

Direct Memory Access

The processor 1 Hold state allows both external devices and the processor 1 to share a common external memory. To gain direct memory access (DMA) to the common memory, the external device first requests the processor to enter a Hold state by asserting (taking low) the HOLD— input. The processor 1 will then enter a Hold state following completion of the cycle (either memory, CRU, external instruction, or internal ALU cyucles) that it is currently performing. Note, however, that a Hold state is not entered between the first and second byte accesses of a full word in the external memory address space, and a Hold state is not entered between the first and second clock cycles of a CRU cycle.

Figure 11:
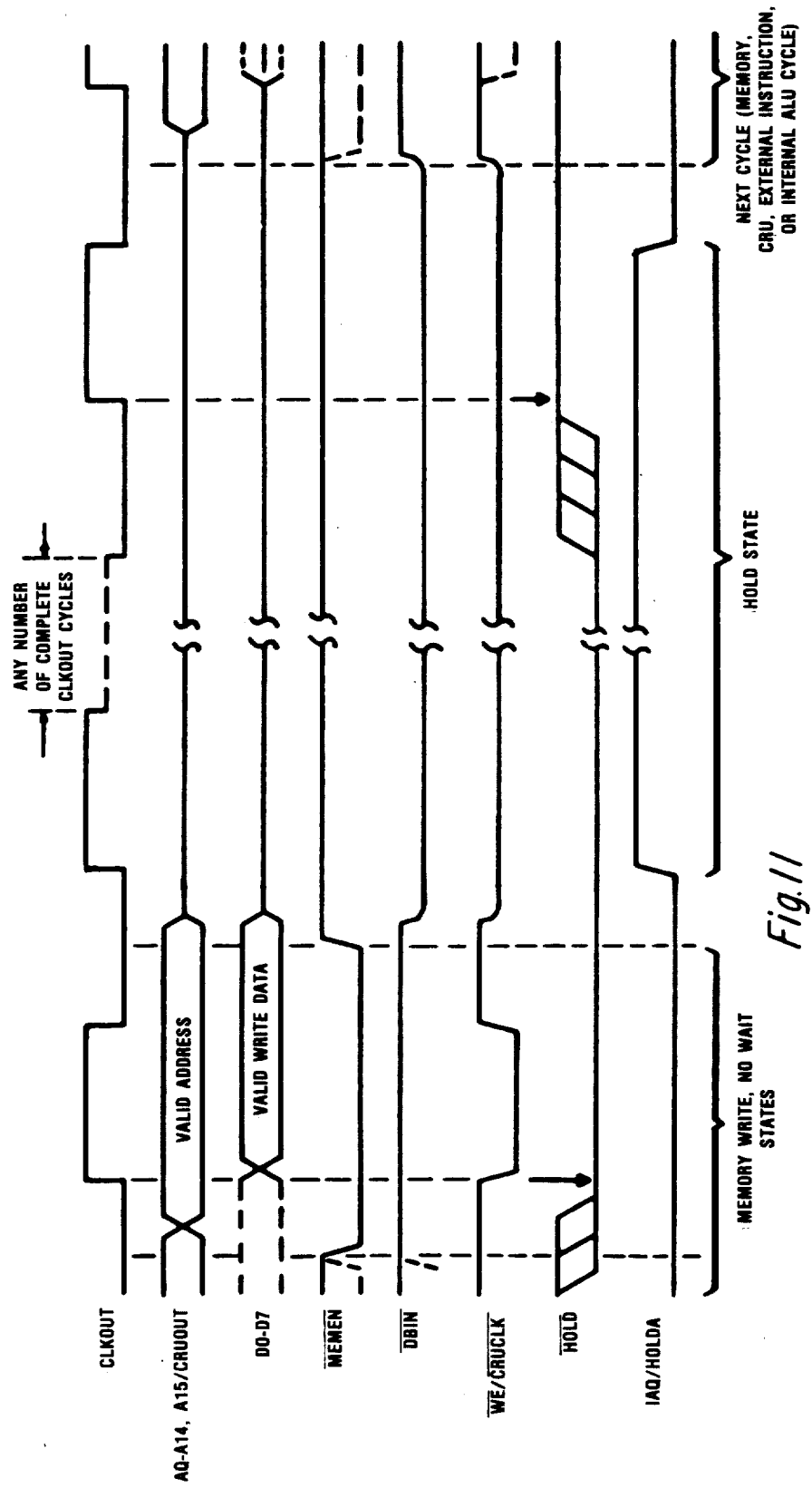
FIG. 11 is a timing diagram for the external memory interface Hold state.

Upon entering of a Hold state, the processor 1 puts its address, data, DBIN—, and WE—/CRUCLK— drivers in the high impedance mode, and asserts IAQ/-HOLDA. The external device can then utilize these signal lines to communicate with the common memory. After the external device has completed its memory transactions, it releases HOLD, and the processor 1 continues instruction execution at the point where it had been suspended. Timing relationships for this sequence are shown in FIG. 11.

To allow DMA loading of external memory on power-up, the processor 1 does not begin instruction execution after a Reset state until HOLD— has been removed if HOLD— was active (low) at the time RESET— was taken from low to high RESET— released.

External devices cannot access the internal (on-chip) memory address space of the processor 1 when it is in the Hold state.

Since IAQ (Instruction Opcode Acquisition) and HOLDA (Hold Acknowledge) are multiplexed on a single signal, IAQ/HOLDA, this signal must be gated with MEMEN— using external logic to separate IAQ and HOLDA. When MEMEN—=0,1AQ/HOLDA can indicate IAQ and when MEMEN—=1, 1AQ/-HOLDA can indicate HOLDA.

Internal Memory Address Space

Access of the internal (on-chip) memory address space (to access the internal RAM 45 and decrementer 51) is transparent to the processor 1 instruction set. That is, operands can be read from and written into locations in the internal memory 45 space simply by using the appropriate addresses via any of the addressing modes in the processor 1 instruction set, and instructions can even be executed from the internal memory space by loading the appropriate address into the program counter 47 of the processor 1.

The processor 1 indicates to the external world when these internal memory address space accesses are occurring by asserting the same signals used for accessing external memory 2 (see FIG. 8) in a manner very similar to an external memory 2 address space access. There are a few differences in these cycles, however, and these differences are detailed in the following paragraphs.

When performing an internal memory address space access, the processor 1 outputs the same signals that it would for an external memory space access, with the same timing (see FIGS. 9 and 10) except for the following:

(1) A single cycle (read or write) is output as both internal bytes are accessed simultaneously. Externally, it appears as though a single byte memory access cycle to an internal address is occurring.)

(2) The cycle always has no Wait states, and the READY input is ignored by the processor 1.

(3) During read cycles, the data bus (D0–D7) output drivers are put in the high-impedance mode. During write cycles, the data bus outputs non-specific data.

During read cycles to the internal memory address space, the processor 1 does not make the read data available to the external world. If an instruction is executed from the internal memory address space, IAQ/-HOLDA is still asserted, but only during the one read cycle shown externally while the full word is read internally.

When a Hold state, external devices are not able to access the internal memory address space.

Internal RAM

The 256 bytes of internal random-access read/write memory 45 (RAM) are organized internally as 128 16-bit words. Since the processor 1 has 16-bit internal data paths, two 8-bit bytes are accessed each time a memory access is made to the internal RAM 45.

Byte accesses are transparent to the internal RAM 45. That is, when an instruction addresses a byte in the internal RAM 45, the processor 1 will: (1) read the entire word but only use the byte specifically addressed for a read operation and, (2) only write to the specifically addressed byte and not alter the contents of the other byte in the word during a write operation.

Decrementer (Timer/Event Counter)

Figure 2:
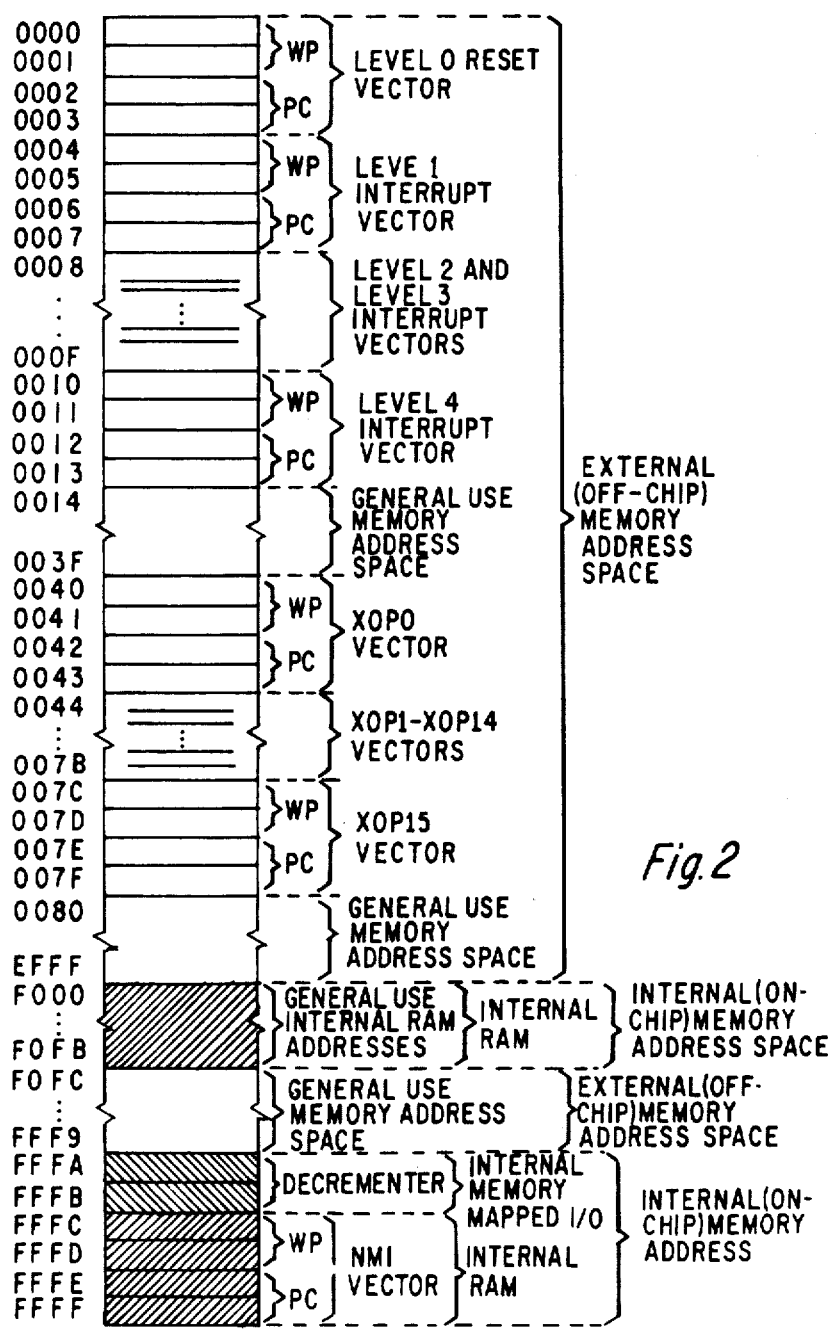
FIG. 2 is a memory map of the processing unit in FIG. 1.
Figure 12:
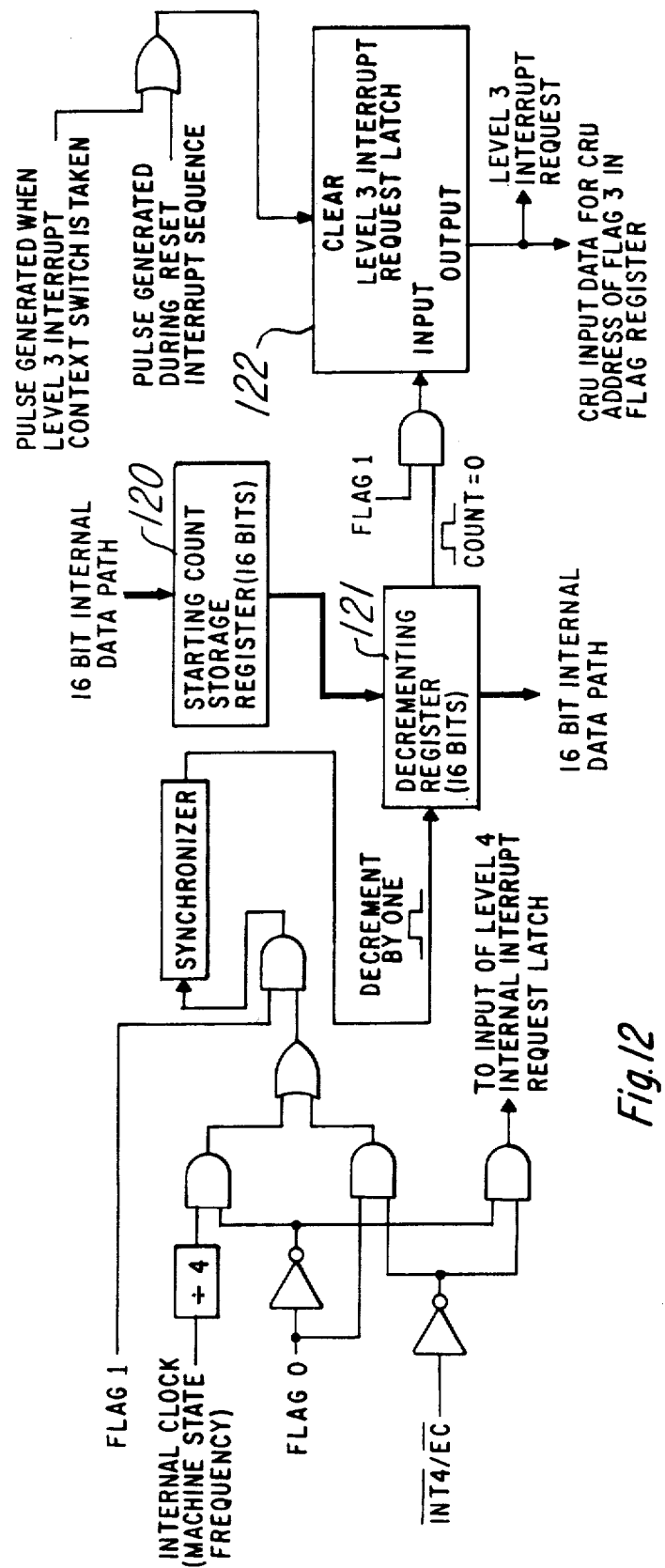
FIG. 12 is a functional block diagram of the decrementor.

Accessible via one of the word addresses (see FIG. 2) of the internal memory-mapped I/O address space is the decrementer 51. The on-chip decrementer logic can function as a programmable read-time clock, an event timer, or as an external event counter. A block diagram of the decrementer that is representative of its functional operation is shown in FIG. 12. Note that Flag 0 and Flag 2 are bits of the Flag Register 53. The decrementer 51 is configured as either a timer or an event counter using bit FLAG0 of the internal Flag register 53. The decrementer 51 is enabled/disabled using bit FLAG1 of the internal Flag register 53. When FLAG0 is set to zero, the decrementer 51 will function as a timer. When FLAG0 is set to one, the decrementer 51 will function as an event counter. When FLAG 1 is set to zero, the decrementer 51 is disabled and will not be allowed to decrement and request level 3 interrupt traps. When FLAG1 is set to one, the decrementer 51 is enabled and will decrement and request level 3 interrupt traps. It should be noted that when the decrement 51 is configured as a timer, INT4−/EC− will be usuable as an external interrupt level 4 trap request. When the decrementer 51 is configured as an event counter, INT4−/EC− is the input for the "event counter" pulses, and an interrupt level 4 trap request input is no longer available externally or internally.

The general operation of the decrementer 51 is as follows. FLAG0 of the Flag register 53 is first set to select the desired mode of operation. The desired start count is then loaded into the Starting Count Storage Register 120 by performing a memory write of the count word to the dedicated internal memory mapped I/O address of the decrementer 51. (This also loads the Decrementing Register 121 with the same count.) The decrementer 51 is then enabled and allowed to start decrementing by setting FLAG1 of the Flag Register 53 to one. Both FLAG0 and FLAG1 are set to zero when the processor 1 is reset. When the count in the Decrementing Register 121 reaches zero, the level 3 internal interrupt request latch 122 is set, the Decrementing Register 121 is reloaded from the Starting Count Storage Register 120, and decrementing continues. Note that writing a start count of $0000_{16}$ to the decrementer 51 will disable it.

When configured as a timer, the decrementer 51 functions as a programmable read-time clock by decreasing the count in the Decrementing Register 121 by one for each fourth CLKOUT cycle. Loading the decrementer 51 with the appropriate start count causes an interrupt to be requested every time the count in the Decrementing Register 121 reaches zero. The decrementer 51 can also be used as an event timer when configured as a timer by reading the decrementer 51 (which is accomplished by performing a memory read from the dedicated internal memory mapped I/O address of the decrementer) at the start and stop points of the event of interest and comparing the two values. the difference will be a measurement of the elapsed time.

When configured as an event counter, operation is as previously discussed except that each high-to-low transition on INT4−/EC− will cause the decrementing Register 121 to decrement. These INT4−/EC− high-to-low transitions can be asynchronous with respect to CLKOUT. Note that INT4−/EC− can function as a negative edge-triggered interrupt by loading a start count of one.

The decrementer 51 should always be accessed as a full word (two 8-bit bytes). Reading a byte from the decrementer does not present a problem since only the byte specifically addressed will be read. Writing a single byte to either of the bytes of the decrementer will result in the data byte being written into the byte specifically addressed and random its being written into the other byte of the decrementer 51.

Wait State Generation

Wait states can be generated for external memory cycles, external CRU cycles and external instruction cycles for the processor 1 using the READY input. A Wait state is defined as extension of the present cycle by one CLKOUT cycle. The timing relationships of the READY input to the memory interface and the CRU interface signals are shown in FIG. 13. Note that Wait states cannot be generated for memory cycles that access the internal memory address space or for CRU cycles that access the internal CRU address space, as the READY input will be ignored during these cycles.

In FIG. 13a, the contents of the data bus is input into the internal registers at point 125 since the READY line is high. In FIG. 13b, there is an attempted read at point 126 but since the READY line is low, there is one wait state. The data is then read in in point 127 at the fall of the next clock since the READY line is high at that time. Note that in both FIGS. 13a and b there is not an automatic wait state condition present. In FIG. 13c, the automatic wait state condition is present and no access is attempted at time 128. However, at 129 when the ready line is high, the data bus is read. FIGS. 13d and 13e refer to the communications register unit interface. Note that at time 130 when the READY line is high, there is an access. In FIG. 13e at point 131 since the READY line is low, there will be no access but the access will wait until the second clock edge at 132. Note that the automatic first wait state condition does not apply to CRU cycles.

The Automatic First Wait State Generation feature of the processor 1 allows a Wait state to be inserted in each external memory cycle, regardless of the READY input, as shown in FIG. 13. The Automatic First Wait State Generation feature can be involved when RESET— is asserted. If READY is active (high) when RESET— goes through a low-to-high transition, the first Wait state in each external memory cycle will be automatically generated. If READY is inactive (low) when RESET— goes through a low-to-high transition, no Wait state will be inserted automatically in each external memory cycle. There is a one and one-half CLKOUT cycle time minimum setup time requirement on READY before RESET— low-to-high transition. The recommended external circuitry for invoking or inhibiting the Automatic First Wait State Generation feature is shown in FIG. 14. Note that this feature does not apply to internal memory address space accesses, external instruction cycles, or any CRU cycles. Wait states cannot be generated during internal ALU/other operation cycles. The READY input is ignored during these cycles.

Figure 13F:
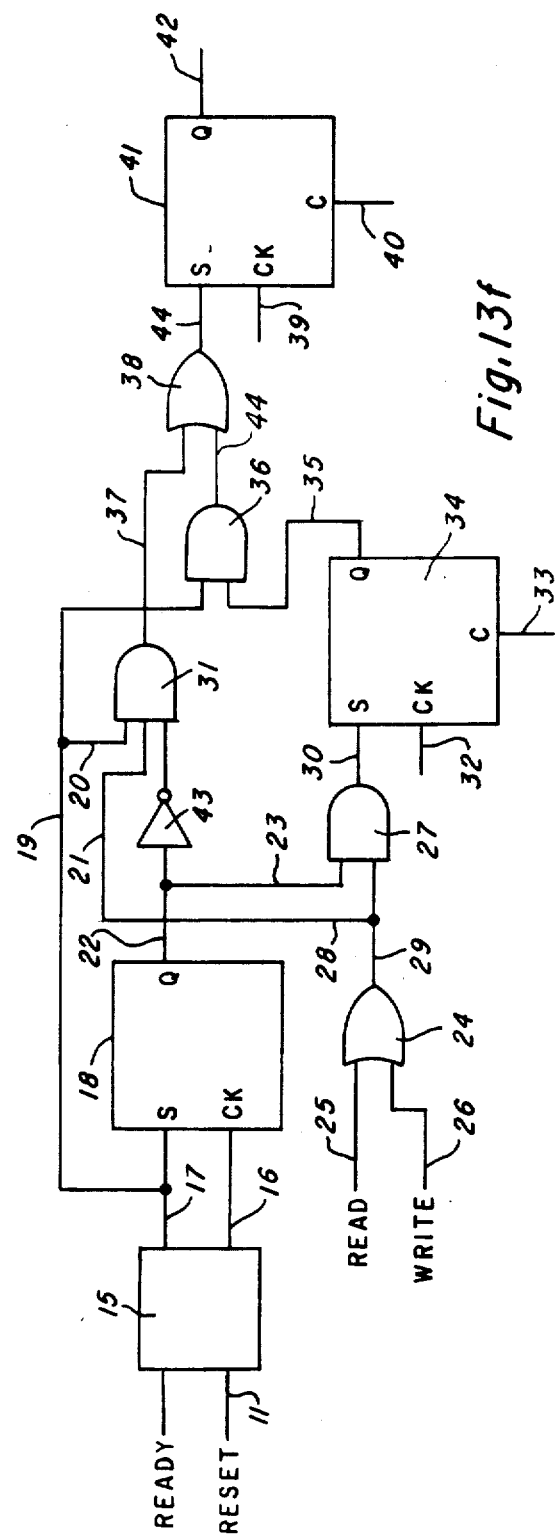
FIG. 13f is a logic diagram showing the logic circuitry used to generate the automatic first Wait state condition.

A circuit for providing the wait state is shown in FIG. 13f. Block 15 contains the circuitry that will determine if an automatic wait state condition is required in the operation of the processor 1. The contents of block 15 are illustrated in FIGS. 14A, B and C. Block 15 receives as inputs the READY line and the RESET— line on line 11. The output of block 15 are lines 17 which represents the READY line and line 16 which is the RESET— signal. Line 17 and 16 are input into block 18 which is a SR type flip flop. The RESET— signal on line 16 is used to clock the flip flop as shown. The READY signal on line 17 is used to set the flip flop. The output of this flip flop determines whether or not the auto wait state condition is required. If the condition is required, then the ready line will be high at the rising edge of RESET; thus clocking the flip flop 18 and inputting a 1 into the S terminal causing a 1 to be present on the Q terminal of flip flop 18. Therefore line 22 will be high to indicate the auto wait state condition being present. Located below the flip flop 18 is OR gate 24 which receives a read line input 25 and the write line 26. The output of the OR gate 24, line 29, is high when either a memory read or memory write operation is being performed. This provides an input into AND gate 27 and AND gate 31. Referring now to AND gate 31, the ready line inputs a signal into AND gate 31 via line 17, line 19 and line 20. AND gate 31 also receives an input from the read/write OR gate 24 via line 28 and 21. The AND gate 31 further receives the output of flip flop 18 via line 22 which is inverted in inverter 43. AND gate 31 produces a high output of line 37 when the READY line is high, when there is a READ/WRITE operation and when the AUTO/WAIT state condition is not selected. AND gate 27 is used to start the auto wait state process. AND gate 27 receives an input from flip flop 18 from line 22 and line 23 to indicate the selection of the auto wait state condition. In additon to receiving the output over line 29 from the read/write OR gate 24. AND gate 27 produces a high output on line 30 when the auto wait state condition has been selected and a read/write sequence has begun. Line 30 is used as an input to flip flop 34 which receives an additional input 32 from the central processing unit internal clock. Flip flop 34 produces an output level on line 35 when the clock signal on line 32 goes high and the output from AND gate 27 is high on line 30. This output is ANDed in AND gate 36 with line 19 which is the READY signal from the external memory 2. The output of AND gate 36 is ORed with line 37 from AND 31 as previously discussed. When either one of these are high, OR gate 38 places a high output signal into flip flop 41 via line 44. Flip flop 41 is clocked by line 39 which is the internal clock that also clocks flip flop 34 on line 32. The output of flip flop 41 is a high output on line 42 which signifies the transfer of the contents of the data bus to the internal registers within processor 1. It should be noted that lines 33 and 40 which provide clear signals to the flip flops, 34 and 41, respectively, are provided by the processor to clear these flip flops after a reading of the data line.

Processor Interrupts

The processor 1 implements seven prioritized, vectored interrupts, some of which are dedicated to predefined functions and the remaining are user-definable. Table 2 defines the source (internal or external), assignment, priority level, trap vector location in memory, and enabling/resulting status register interrupt mask values for each interrupt.

The processor 1 will grant interrupt requests only between instructions (except for Level 0 Reset), which will be granted whenever it is requested, i.e., in the middle of an instruction). The processor 1 performs additional functions for certain interrupts, and these functions will be detailed in subsequent sections. The basic sequence that the processor 1 performs to service all interrupt requests is as follows:

(1) Prioritize all pending requests and grant the request for the highest priority interrupt that is not masked by the current value of the interrupt mask in the status reguster 46 or the instruction that has just been executed.

(2) Make a context switch using the trap vector specified for the interrupt being granted.

(3) Reset ST7 through ST11 in the status register 46 to zero, and change the interrupt mask (ST12 through ST15) as appropriate for the level of the interrupt being granted.

(4) Resume execution with the instruction located at the new address contained in the PC 47, and using the new WP 48. All interrupts will be disabled until after this first instruction is executed, unless: (a) RESET— is requested, in which case it will be granted, or (b) the interrupt being granted is the MID request and the NMI— interrupt is requested simultaneously (in which case the NMI request will be granted before the first instruction indicated by the MID trap vector is executed.)

This sequence has several important characteristics. First of all, for those interrupts that are maskable with the interrupt mask in the status register, the mask will et changed to a value that will permit only interrupts of higher priority to interrupt their service routines. Secondly, status bit ST10 (overflow interrupt enable) is reset by zero by the servicing of any interrupt so that overflow interrupt requests cannot be generated by an unrelated program segment. Thirdly, the disabling of other interrupts until after the first instruction of the service routine is executed permits the routine to disable other interrupts by changing the interrupt mask with the first instruction. Lastly, the vectoring and prioritizing scheme of the processor 1 permits interrupts to be automatically nested in most cases. If a higher priority interrupt occurs while in an interrupt service routine, a second context switch occurs to service the higher priority interrupt. When that routine is complete, a return instruction (RTWP) restores the saved context to complete processing of the lower priority interrupt. Interrupt routines should, therefore, terminate with the return instruction to restore original program parameters.

External Interrupt Requests

Each of these interupts is requested when the designated signal is supplied to the processor 1.

Interrupt Level 0 (RESET—)

Interrupt Level 0 is dedicated to the RESET— input of the processor. When active (low), RESET— causes the processor to stop instruction execution and to inhibit (take to logic level high) MEMEN—, DBIN—, and WE—/CRUCLK—. The processor 1 will remain in the Reset state as long as RESET— is active.

When RESET— is released (low-to-high transition), the processor 1 performs a context switch with the Level 0 interrupt trap vector (WP and PC of trap vector are in memory word addresses $0000_{16}$ and $0002_{16}$, respectively.) Note that the old WP, PC and ST are stored in workspace registers 13, 14, and 15 of the new workspace. The processor 1 then resets all status register bits, the internal interrupt request latches, Flag Register bits FLAG0 and FLAG1 and the MID Flag. After this, the processor 1 starts execution with the new PC 47.

If HOLDA is active (high) due to HOLD— being active (low) when RESET— becomes active, RESET— will cause HOLDA to be released (taken low) at the same time as MEMEN—, DBIN—, and WE—/CRUCLK— are taken inactive (high). HOLD— can remain active as long as RESET— is active and HOLDA will not be asserted. If HOLD— is active and the processor 1 will remain in this hold state until HOLD— is released. This RESET— and HOLD— priority scheme facilitates DMA loading of external RAM upon power-up.

Timing relationships of the RESET— signal are shown in FIG. 15. Note that don't cares 140 indicate that any type of processor cycle can be taking place. At 150 RESET— is sampled at every high-to-low CLKOUT transition. At point 151 RESET— is required to be active low for a minimum of two samples to initiate the sequence. The context switch would begin one CLKOUT cycle after 151 if RESET— were active high at 151. At point 152, the context switch using the RESET trap vector begins one CLKOUT cycle after RESET— is sampled as having returned to the inactive high level.

Release of the RESET— signal is also the time at which the Automatic First Wait State function of the processor 1 can be invoked.

Non-Maskable Interrupt (NMI—)

The NMI— signal is the request input for the NMI level interrupt and allows ROM loaders single-step/breakpoint/maintenpanel functions, or other user-defined functions to be implemented for the processor 1.

NMI— being active (low) according to the timing illustrated in FIG. 16 constitutes a request for the NMI level interrupt. Note at point 155 NMI— is sampled every high to low CLKOUT transition. To be recognized, NMI— must be active low at the end of an instruction. Since instructions are variable in length, the minimum active time for NMI— is variable according to the instruction being executed. Point 153 illustrates the last possible time that NMI— must be recognized at or before execution of the next instruction. The NMI— context, which begins 3 CLKOUT cycles after execution of the current instruction is complete. At points 156, after an NMI— context switch sequence has been initiated, NMI— can remain active low indefinitely without causing consecutive NMI— trap requests. To enable another NMItrap request, NMI— must be taken inactive high and be sampled at least once at the inactive level. The processor 1 services this request exactly according to he basic sequence previously described, with the priority level, trap vector location, and enabling/resulting status register interrupt mask values as defined in Table 2. Note that the processor 1 will always grant a request for the NMI level interrupt immediately after execution of the currently executing instruction is completed since the NMI is exempt from the interrupt-disabling-after-execution characteristic of certain instructions and also the current value of the interrupt mask.

It should also be noted that the processor 1 implements four bytes of its internal RAM 45 at the memory address of the NMI vector. This allows usage of the NMI level in minimum-chip processor 1 systems. It also requires, however, that this vector must be initialized, upon power-up, before the NMI level interrupt can be requested.

Interrupt Levels 1 and 4 (INT1— and INT4/EC—)

The INT1— and INT4—/EC— signals are the request inputs for the Level 1 and Level 4 interrupts, respectively. (Note that if the decrementer is configured as an event counter, INT4—/EC— is no longer a Level 4 interrupt request input. levels 1 and 4 are maskable, user-definable interrupts.

Figure 17:
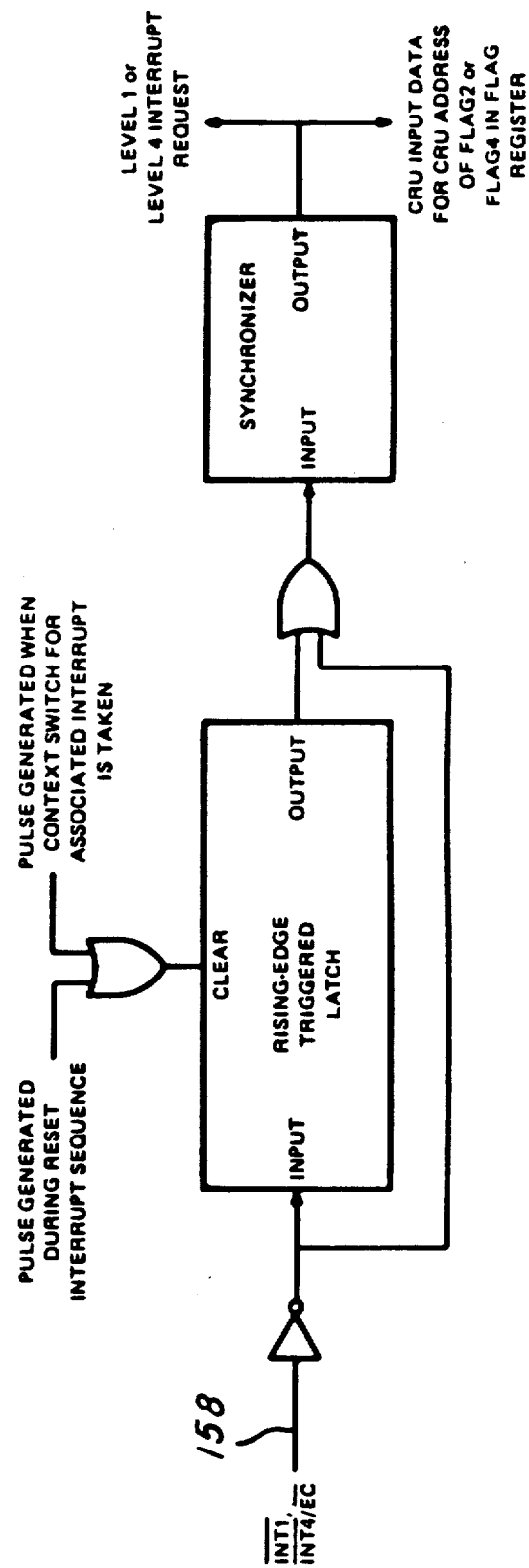
FIG. 17 is a functional diagram of the internal interrupt request latch.

The INT1— and INT4—/EC— interrupt inputs can accept either asynchronous pluses or asynchronous levels as input signals. An internal interrupt request latch stores the occurrence of a pulse. A block diagram of the processor 1 internal logic for these request latches that is representative of their functional operation is shown in FIG. 17. Note at point 158 a separate latch and synchronizer is implemented for level (INT1—) and level 4 (INT4—/EC—). For level 1 the input shown here is directly from the INT1— pin. For level 4 the input shown is from the gating shown in FIG. 12. Note that with this implementation only a single interrupt source is allowed if the input signal is a pulse, but multiple interrupt sources can be wired-Ored together provided that each source supplies a level as the input signal. (The levels are then removed one at a time by a hardware/software mechanism activated by the interrupt subroutine as each interrupting source is serviced by the subroutine.)

The processor 1 services each of these requests exactly according to the basic sequence previously described with the priority levels, trap vector locations, and enabling/resulting status register interrupt mask values as defined in Table 2. Each internal interrupt request latch will get reset when the context switch for its associated interrupt level occurs.

Internally Generated Interrupts

Each of these interrupts is requested when the designated condition has occurred in the processor 1.

Macro Instruction Detection (MID) Interrupt

The acquisition and attempted execuion of an MID interrupt opcode will cause the MID level interrupt to be requested before execution of the next instruction begins. In addition to requesting the MID level interrupt, the MID flag is set to one "1". The processor 1 services this request exactly according to the basic sequence previously described, with the priority level, trap vector location, and enabling/resulting status register interrupt mask values as defined in Table 2. Note that the processor 1 will always grant a request for the MID level interrupt since MID is not affected by the interrupt mask and is higher in priority than any other interrupt except for Level 0, Reset. If the NMI interrupt is requested during an MID interrupt context switch, the MID interrupt context switch will be immediately followed by the NMI interrupt service sequence before the first instruction indicated by the MID interrupt is executed. This is done so that the NMI interrupt can be used for a single-step function with MID opcodes. Servicing the MID interrupt request is viewed as "execution" of an MID interrupt opcode. NMI allows the processor 1 to be halted immediately after encountering an MID opcode.

It should also be noted that the MID interrupt shares its trap vector with Level 2, the Arithmetic Overflow interrupt. The interrupt subroutine beginning with the PC of this vector should examine the MID Flag to determine the cause of the interrupt. If the MID Flag is set to "1", an MID interrupt has occurred, and if the MID Flag is set to "0", an Arithmetic Overflow interrupt has occurred. The portion of this interrupt subroutine that handles MID interrupts should always, before returning from the subroutine, reset the MID Flag to "0".

The MID interrupt has basically two applications. The MID opcodes can be considered to be illegal opcodes. The MID interrupt is then used to detect errors of this nature. The second and primary application of the MID interrupt, is to allow the definition of additional instructions for the processor 1. MID opcodes are used as the opcodes for these macro instructions. Software in the MID interrupt service routine emulates the execution of these instructions. The benefit of this implementation of macros is that the macro instructions can be implemented in microcode in future processors and software will then be directly transportable to these future processors.

Note that the processor 1 interrupt request processing sequence does create some difficulties for re-entrant usage of MID interrupt macro instructions. In general, to avoid possible errors, MID interrupt macro instructions should not be used in the NMI and Level 1 interrupt subroutines, and should only be used in the Reset subroutine if Reset is a complete initialization of the system.

Arithmetic Overflow Interrupt

The occurrence of an arithmetic overflow condition, defined as status register 46 bit 4 (ST4) getting set to one can cause the Level 2 interrupt to be requested. Note that this request will e granted immediately after the instruction that caused the overflow condition. The processor 1 services this request exactly according to the basic sequence previously described with the priority level, trap vector location, and enabling/resulting status register interrupt mask values as defined in Table 2.

In addition to being maskable with the interrupt mask, the Level 2 overflow interrupt request is enabled/disabled by status register bit 46 10 (ST10), the Arithmetic Overflow Enable Bit (i.e., ST10=1 enables overflow interrupt request; ST10=0 disables overflow interrupt request). If servicing the overflow interrupt request is temporarily overridden by servicing of a high priority interrupt, the occurrence of the overflow condition will be retained in the contents of the status register 46, i.e., ST4=1, which is saved by the higher priority context switch. Returning from the higher priority interrupt subroutine via an RTWP instruction causes the overflow condition to be reloaded into status register 46 bit ST4 and the overflow interrupt to be requested again (upon completion of RTWP instruction). The arithmetic overflow interrupt subroutine must reset ST4 or ST10 to zero in the status word saved in workspace register 15 before the routine is completed to prevent generating another overflow interrupt immediately after the return.

It should also be noted that the Level 2 arithmetic overflow interrupt shares its trap vector with the MID interrupt.

Decrementer Interrupt

The occurrence of an interrupt request by the decrementer will cause the Level 3 internal interrupt request latch to get set. This latch is similar to those for Levels 1 and 4 in that it is reset by servicing a Reset interrupt or when the context switch for its associated interrupt level occurs (FIG. 17).

The Level 3 internal interrupt request latch being set constitutes a request for a Level 3 interrupt, and the processor 1 services this request exactly according to the basic sequence previously described with the priority level, trap vector location, and enabling/resulting status register interrupt mask values as defined in Table 2.

Communication Register Unit Interface

The processor 1 accomplishes bit I/O of varying field width through the use of the Communications Register Unit (CRU). In applications demanding a bit-oriented I/O interface, the CRU performs its most valuable act: transferring a specified number of bits to or from memory and a designated device. Thus, the CRU is simply a linking mechanism between memory and peripherals.

Acting as a shift register, the CRU is a separate hardware structure of the processor 1. This structure can serially transfer up to 16 bits of data between the CRU and a specified device in a single operation. The 32768-bit CRU address space may be divided into any combination of devices, each containing any number of input or output bits. When given the bit address of a device, the CRU can test or modify any bit in that unit. Several consecutive addresses can be occupied by a device. These CRU applications are controlled by single and multiple-bit instructions.

Single-bit instructions facilitate the testing or modification of a particular bit in a device. The device in which a bit is to be tested (TB), set to zero (SBZ), or set to one (SBO) is designated by the sum of the value workspace in workspace Register R12 and an 8-bit signed displacement value included as an operand of that instruction.

Multiple-bit instructions control the serial transfer of up to 16 bits between memory and peripherals. The device with which communication is to take place is addressed by workspace Register R12. The memory address to or from which data is to be transferred, as well as the number of bits to be transferred are included as operands of the multiple-bit instruction.

Figure 18:
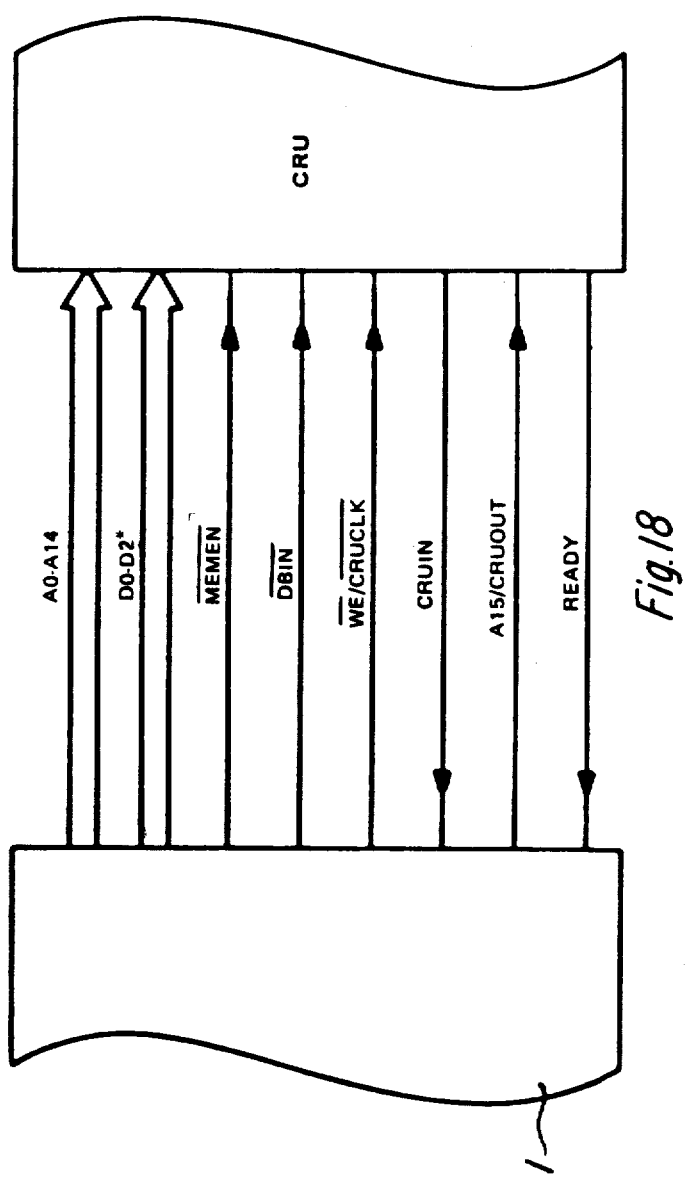
FIG. 18 is a diagram of the interface signals to the communication register unit.
Figure 19:
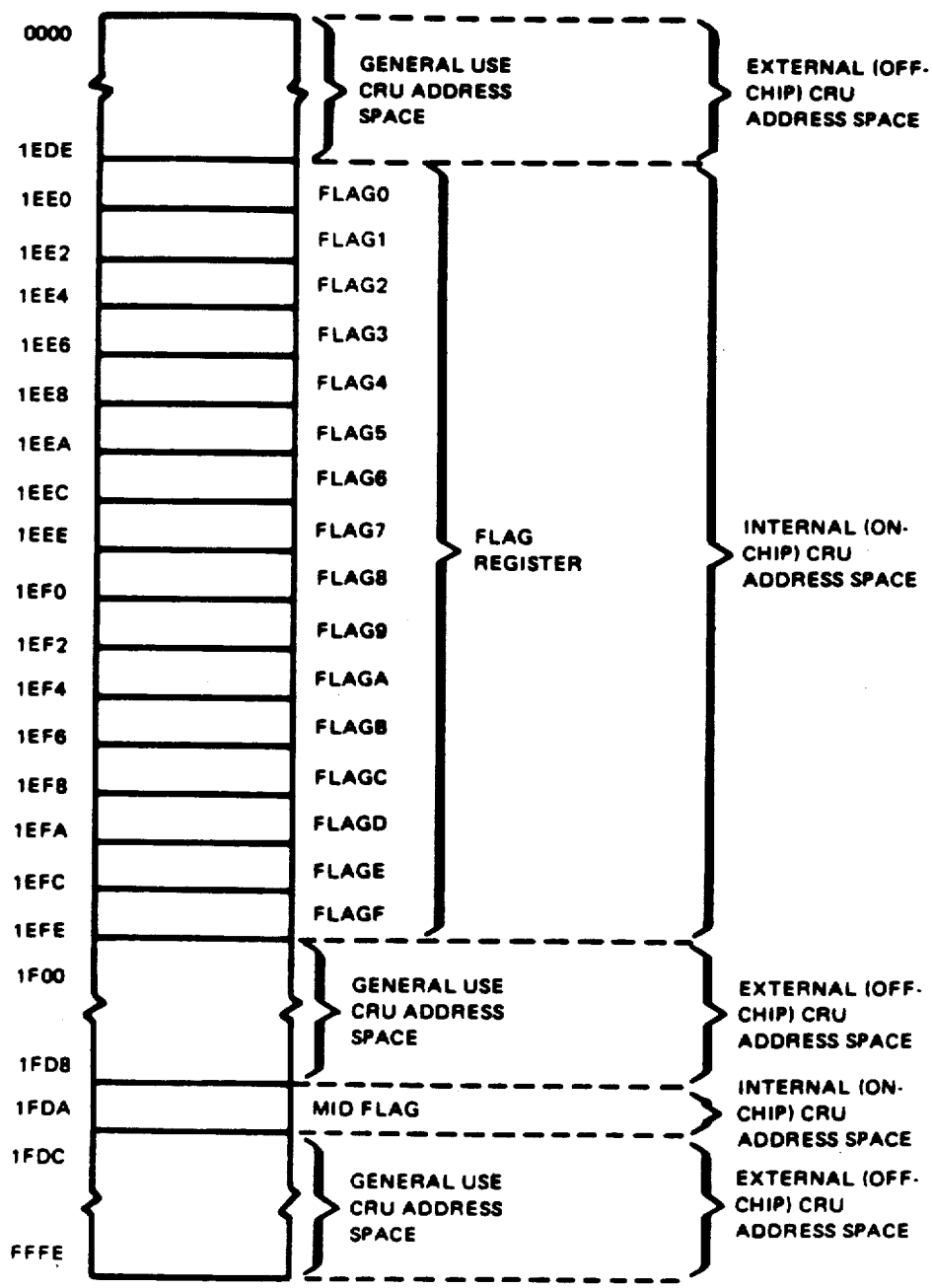
FIG. 19 is a diagram of the communication register address map.

The signals used in the processor 1 interface to the CRU are shown in FIG. 18. The CRU address map is shown in FIG. 19.

The concept of "CRU space" is the key to CRU operations. An ideological area exists in which peripheral devices reside in the form of an address. The CRU space is this ideological area; it has monotonically increasing bit addresses. Each bit represents a bistable I/O point which can be read from or written to. CRU address space and memory address space are independent of each other. Memory space is byte-addressable and CRU space is bit-addressable. Therefore, a desired device is accessed by placing its software base address in workspace Register R12 and exercising the CRU commands.

CRU nomenclature is built around the four address types involved in its operation. The software base address, hardware base address, address displacement, and CRU bit address interact to link memory to peripherals in bit-serial communication via the CRU.

The software base address consists of the entire 16 bits of workspace register R12. In workspace register R12, the programmer loads twice the value of the CRU hardware address of the device with which he wishes to communicate. Because only bit 0 through 14 of workspace register R12 are placed on the address bus, the programmer needs to shift the hardware base address left one position.

Figure 20:
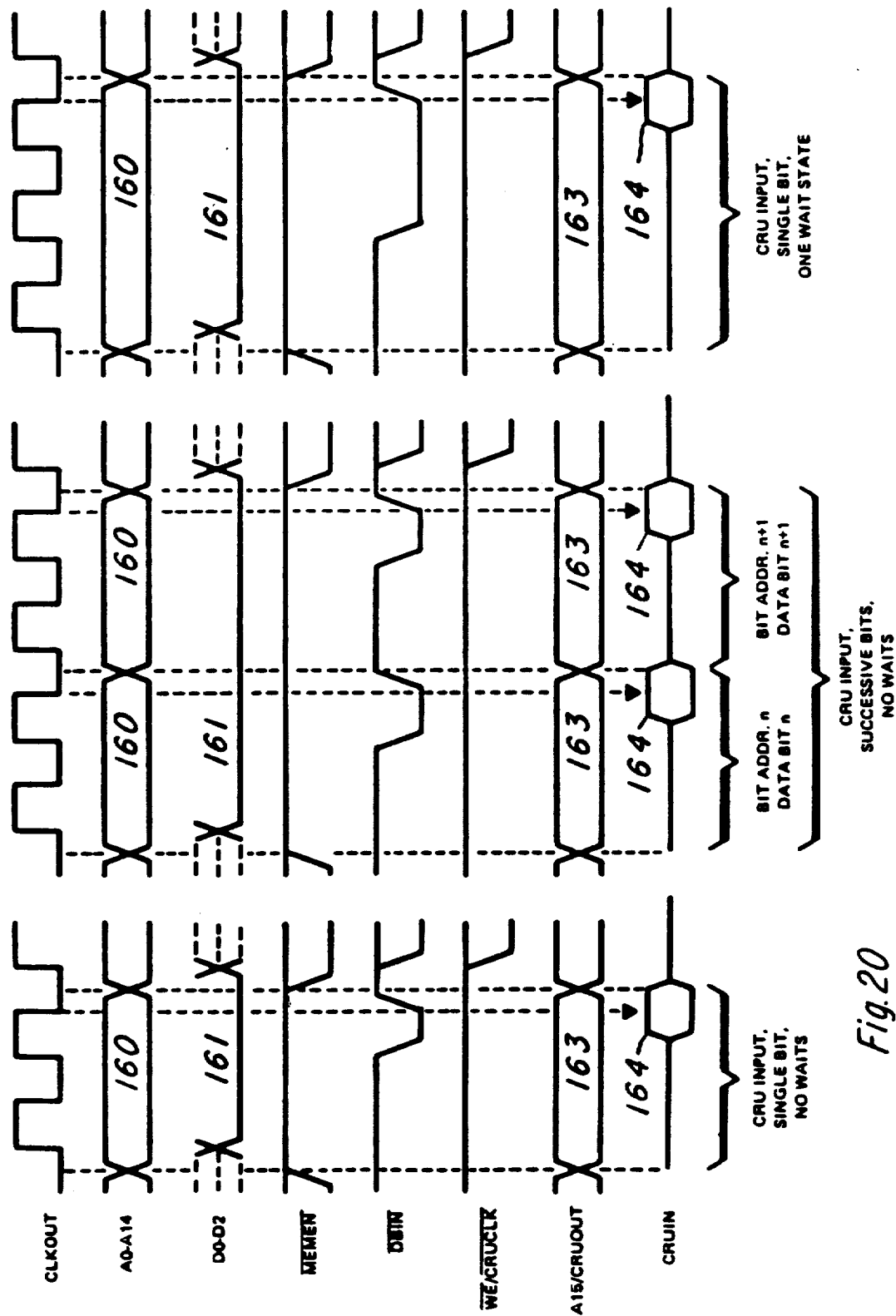
FIG. 20 is a timing diagram for the communications register unit input cycle.

Bit 0 through 14 of workspace Register R12 form the hardware base address. For the single-bit instructions, the hardware base address is added to the address displacement to obtain the CRU bit address. For multiple-bit instructions the hardware base address is the CRU bit address. External CRU Devices To input a data bit from an external (off-chip) CRU device, the processor 1 first outputs the appropriate address on A0–A14. The processor 1 leaves ME-MEN— high, outputs logic zeros on D0–D2, strobes DBIN—, and reads in the data bit on CRUIN. Completion of each CRU input cycle and/or generation of Wait states is determined by the READY input. Timing relationships of the CRU input cycle are shown in FIG. 20. Note at point 160, the address is valid. At 161 D0–D2 each output a logic 0. At 163 there is a nonspecific output bit. At 164 the CRU input bit must be valid on CRUIN at the CLKOUT edge indicated.

Figure 21:
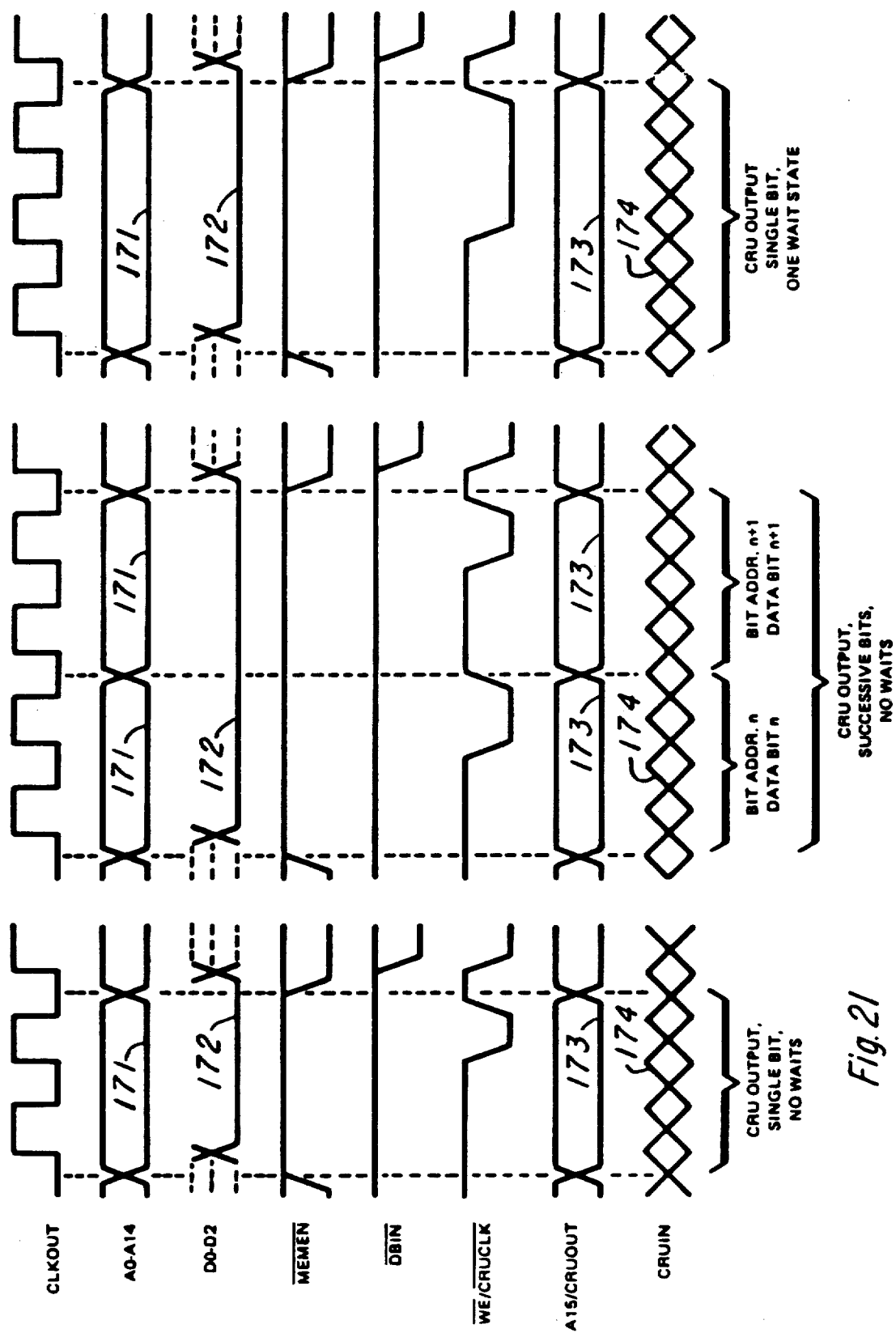
FIG. 21 is a timing diagram for the communications register unit output cycle.

To output a data bit to an external (off-chip) CRU device, the processor 1 first outputs the appropriate address on A0–A14. The processor 1 leaves ME-MEN— high, outputs logic zeros on D0–D2, outputs the data bit on A15/CRUOUT, and strobes WE—/-CRUCLK—. Completion of each CRU output cycle and/or generation of Wait states is determined by the READY input. Timing relationships of the CRU output cycle are shown in FIG. 21. At point 171, the address is valid. At point 172, D0–D2 lines output logic is "0". At point 173 there is a valid CRU output bit for the address being output. Point 174 represents don't care conditions.

For multiple-bit transfers, these input and output cycles are repeated until transfer of the entire field of data bits specified by the CRU instruction being executed has been accomplished.

Single-Bit CRU Operations

The processor 1 performs three single-bit CRU functions: Test Bit (TB), Set Bit to One (SBO), and Set Bit to Zero (SBZ). The SBO instruction performs a CRU output cycle with logic one for the data bit, and the SBZ instruction performs a CRU output cycle with logic zero for the data bit. A TB instruction transfers the address CRU bit from the CRUIN input line to bit 2 of the status register (bit ST2, the EQUAL bit).

Figure 22:
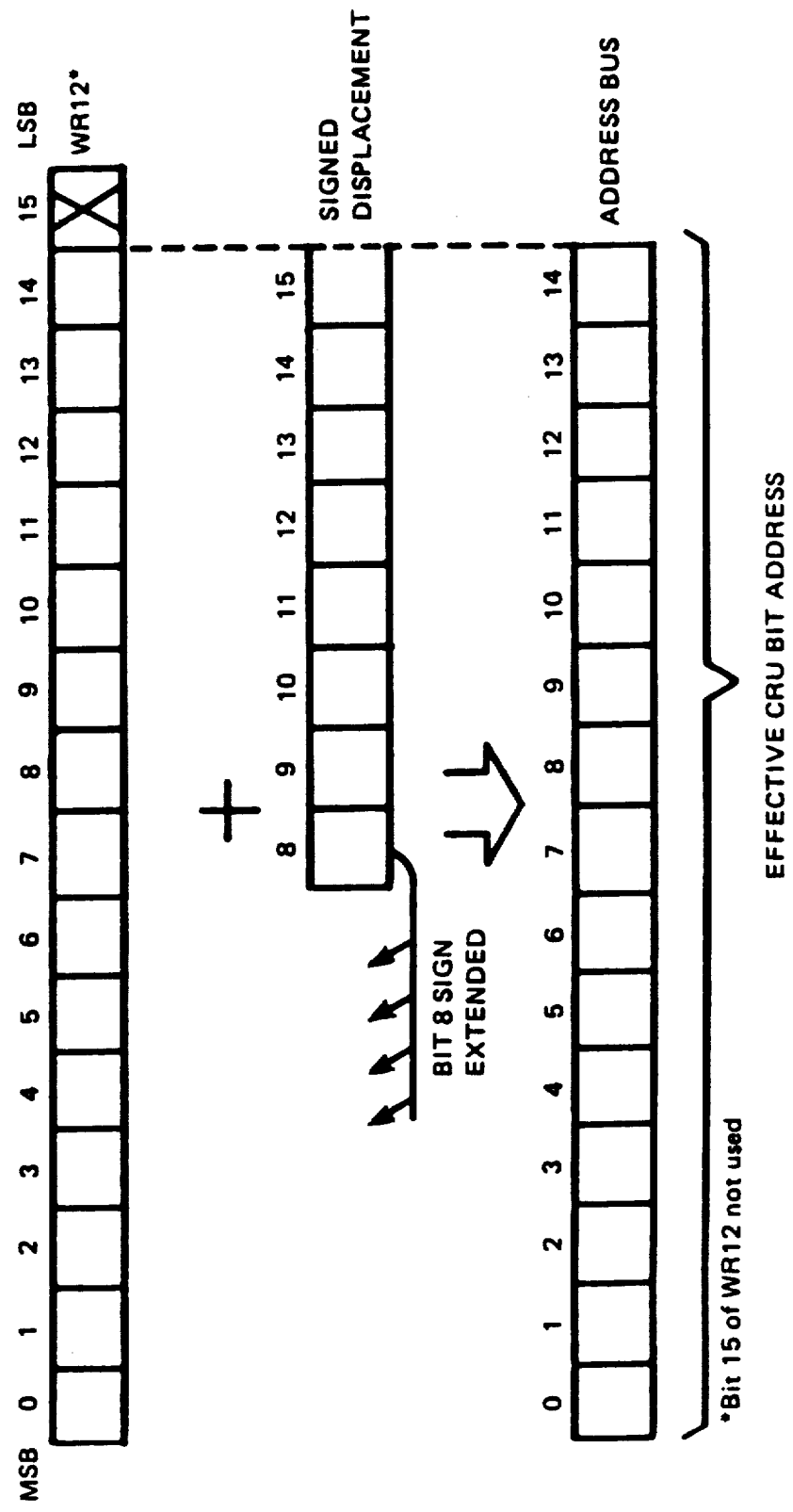
FIG. 22 is a diagram illustrating the single bit communications register unit address development.

The processor 1 develops a CRU bit address for the single-bit operations from the CRU base address contained in workspace register R12 and the signed displacement count contained in bits 8 through 15 of the instruction. The displacement allows two's complement addressing from base minus 128 bits through base plus 127 bits. The base address from workspace Register R12 is added to the signed displacement specified in the instruction and the result is placed onto the address bus. FIG. 22 illustrates the development of a single-bit CRU address.

Multiple Bit CRU Operations

Figure 23:
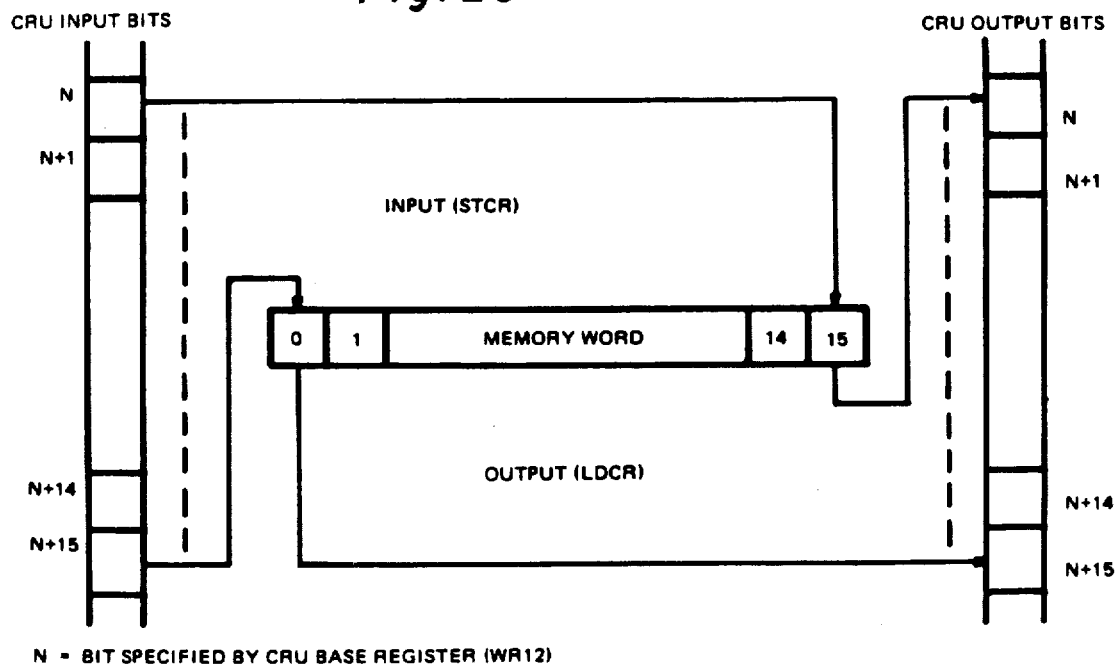
FIG. 23 is a diagram that illustrates the load communications register and store communication registers data transfers.

The processor 1 performs two multiple-bit CRU operations: store communications register (STCR) and load communications register (LDCR). Both operations perform a data transfer from the CRU-to-memory or from memory-to-CRU as illustrated in FIG. 23. Although the figure illustrates a full 16-bit transfer operation, any number of bits from 1 through 16 may be involved.

The LDCR instruction fetches a word from memory and right shifts it to serially transfer it to CRU output bits. If the LDCR involves eight or fewer bits, those bits come from the right-justified field within the addressed byte of the memory word. If the LDCR involves nine or more bits, those bits come from the right-justified field within the whole memory word. Workspace register R12, bits 0 through 14, defines the starting bit address. When transferred to the CRU interface, each successive bit receives an address that is sequentially greater than the address fro the previous bit. This addressing mechanism results in an order reversal of the bits; that is, bit 15 of the memory word (or bit 7) becomes the lowest addressed bit in the CRU and bit 0 becomes the highest bit in the CRU field.

A STCR instruction transfers data from the CRU to memory. If the operation involves a byte or less transfer, the transferred data will be stored right-justified in the memory byte with leading bits set to zero. If the operation involves from nine to 16 bits, the transferred data is stored right-justified in the memory word with leading bits set to zero. When the input from the CRU device is complete, the lowest addressed bit from the CRU is in the least significant bit position in the memory word or byte.

Internal CRU Devices

Access of internal (on-chip) CRU devices is transparent to the processor CRU instructions. Data can be input from and output of the bits of the internal CRU devices simply by using the appropriate CRU addresses to access these bits.

The processor 1 will indicate to the external world when the internal CRU bit accesses are occurring by asserting the same signals used for accessing external CRU devices (see FIG. 18). the timing of these signals for internal CRU input and output cycles will be identical to the timing for external CRU input and output cycles (see FIGS. 20 and 21) except that during internal CRU cycles, the READY input is ignored, i.e., Wait states cannot be generated, and, during internal CRU inptu cycles, the processor 1 will ignore the CRUIN input signal. The internal bit being input will not be available to the external world on CRUIN.

The functional characteristics of the internal CRU devices are described in the following paragraphs.

Flag Register

Accessible via CRU input and output instructions that are executed to dedicated internal CRU bit addresses (see FIG. 19) is the internal Flag Register 53. The 16-bit FlAg Register 53 contains both predefined processor 1 systems flags and user-definable flags as detailed in Table 3. The predefined system flags are the configuration bit for the Decrementer 51, the Decrementer 51 enable bit, and the internal interrupt request latch CRU inputs 54. Note that CRU output operations to the internal interrupt request latch Flag addresses will not cause these latches to be either set or reset. These Flag bits are input only and allow the presence of these interrupt requests to be detected when the occurrence of the interrupts themselves is inhibited by the value of the interrupt mask in the status register 46.

Mid Flag

Accessible via CRU input and output instructions that are executed to a dedicated internal CRU bit address (see FIG. 19) is the MID Flag. The MID Flag is set to one by a MID interrupt, nd reset to zero by the software of the MID interrupt routine. Note that setting the MID Flag to one with a CRU instruction will not cause the MID interrupt to be requested.

External Instructions

The processor 1 has five external instructions (see Table 4) that allow user-defined external functions to be initiated under program control. These instructions are CKON, CKOF, RSET, IDLE, and LREX. Execution of an IDLE instruction causes the processor 1 to enter the idle state and remain in this state until a request occurs for an interrupt level that is not masked by the current value of the interrupt mask in the status register. (Note that the Reset and NMI interrupt levels are not masked by any interrupt mask value.) When any of these five instructions are executed by the processor 1, the processor 1 will use the CRU interface (see FIG. 18) to perform a cycle that is identical to a single-bit CRU output cycle (see FIG. 21) except for the following: (1) the address being output will be non-specific, (2) the data bit being output will be non-specific, (3) a code, specified in Table 4, will be output on D0–D2 to indicate the external instruction being executed. Note that completion of each external instruction and/or generation of Wait states is determined by the READY input.

When the processor 1 is in the idle state, cycles with the idle code will occur repeatedly until a request for an interrupt level that is not masked by the interrupt mask in the status register 46 occurs.

A Hold state can occur during an Idle state, with entry to and return from the Hold state occurring at the Idle code cycle boundaries.

Internal ALU/Other Operation Cycles

When the processor 1 is performing an operation internally and is not using the memory, CRU, or external instruction interfaces or is not in the Hold state, the processor 1 will, for as many CLKOUT cycles as needed, do the following with its interface signals:

1. Output a non-specific address on A0–A14 and A15/CRUOUT
2. Output non-specific data on D0–D7
3. Output logic level high on MEMEN−, DBIN−, and WE−/CRUCLK−
4. Output logic level low on IAQ/HOLDA, and
5. Ignore the READY and CRUIN inputs.

The HOLD input is still active, however, as the processor 1 can enter a Hold state while performing an internal ALU/other operation. Also, all interrupt inputs are still active.

TABLE 1

| REGISTER NO. | CONTENTS | USED DURING |
|---|---|---|
| 0 | Shift count (optional) | Shift instructions (SLA, SRA, SRC, and SLC) |
|  | Multiplicand and MSW of result | Signed Multiply |
|  | MSW of dividend and quotient | Signed Divide |
| 1 | LSW of result | Signed Multiply |
|  | LSW of dividend and remainder | Signed Divide |
| 11 | Return Address | Branch and Link Instruction (BL) |
|  | Effective Address | Extended Operation (XOP) |
| 12 | CRU Base Address | CRU instructions (SBO, SBZ, TB, LDCR, and STCR) |
| 13 | Saved WP register | Context switching (BLWP, RTWP, XOP, interrupts) |
| 14 | Saved PC register | Context switching (BLWP, RTWP, XOP, interrupts) |
| 15 | Saved ST register | Context switching (BLWP, RTWP, XOP, interrupts) |

TABLE 2

| PRIORITY LEVELS (In Order of Priority) | VECTOR LOCATION (Memory Address, In Hex) | MASK VALUES TO ENABLE ACCEPTING THE INTERRUPT (ST12 THRU ST15) | MASK VALUE AFTER TAKING THE INTERRUPT (ST12 THRU ST15) | SOURCE AND ASSIGNMENT |
|---|---|---|---|---|
| 0 (Highest Priority) | 0000 | $0_{16}$ thru $F_{16}$ | 0000 | External: Reset ($\overline{RESET}$ Signal) |
| MID | 0008 | $0_{16}$ thru $F_{16}$ | 0001 | Internal: MID |
| NMI | FFFC | $0_{16}$ thru $F_{16}$ | 0000 | External: User-defined ($\overline{NMI}$ Signal) |
| 1 | 0004 | $1_{16}$ thru $F_{16}$ | 0000 | External: User-defined ($\overline{INT1}$ Signal) |
| 2 | 0008 | $2_{16}$ thru $F_{16}$ | 0001 | Internal: Arithmetic Overflow |
| 3 | 000C | $3_{16}$ thru $F_{16}$ | 0002 | Internal: Decrementer |
| 4 | 0010 | $4_{16}$ thru $F_{16}$ | 0003 | External: User-defined |

TABLE 3

| BIT | CRU BIT ADDRESS | DESCRIPTION | |
|---|---|---|---|
| FLAG0 | 1EE0 | Set to 0: | Decrementer configured as Interval Timer. |
|  |  | Set to 1: | Decrementer configured as Event Counter. |
| FLAG1 | 1EE2 | Set to 0: | Decrementer not enabled |
|  |  | Set to 1: | Decrementer enabled (will decrement and can set internal latch that requests a level 3 interrupt). |
| FLAG2 | 1EE4 | Level 1 Internal Interrupt Request Latch CRU Input (Input-only). 0: Level 1 request not present 1: Level 1 request present | |
| FLAG3 | 1EE6 | Level 3 Internal Interrupt Request Latch CRU Input (Input-only). 0: Level 3 request not present 1: Level 3 request present | |
| FLAG4 | 1EE8 | Level 4 Internal Interrupt Request Latch CRU Input (Input-only). 0: Level 4 request not present 1: Level 4 request present | |
| FLAG5 | 1EEA | User Defined | |
| FLAG6 | 1EEC |  | |
| FLAG7 | 1EEE |  | |
| FLAG8 | 1EF0 |  | |
| FLAG9 | 1EF2 |  | |
| FLAGA | 1EF4 |  | |
| FLAGB | 1EF6 |  | |
| FLAGC | 1EF8 |  | |
| FLAGD | 1EFA |  | |
| FLAGE | 1EFC |  | |
| FLAGF | 1EFE |  | |

TABLE 4

| INSTRUCTION | CODE DURING CYCLE | | |
|---|---|---|---|
|  | D0 | D1 | D2 |
| CRU: SBO, SBZ, TB, LDCR or STCR | 0 | 0 | 0 |
| IDLE | 0 | 1 | 0 |
| RSET | 0 | 1 | 1 |
| CKON | 1 | 0 | 1 |
| CKOF | 1 | 1 | 0 |
| LREX | 1 | 1 | 1 |

What is claimed is:

1. In a digital processing system including a processor with an internal clock and an external memory, a memory interface connected between the processor and external memory, the memory interface comprising:
   an information transfer bus operably connected between the processor and the external memory for transferring of information between the processor and the external memory;
   control means connected to the information transfer bus and the processor for generating at least one control signal for synchronously controlling the transfer of information on the information bus by controlling the time at which the processor reads information from the external memory;
   flip-flop means having a first logic state and a second logic state for selecting whether to time delay the control signal; and
   wait circuit connected to said control means and said flip flop means for delaying the control signal by a first time delay when the flip flop means is at the first logic state.

2. A memory interface according to claim 1, wherein the information bus includes an address bus for providing addresses in the external memory of information to be transmitted to or to be received from the processor and further includes a data bus to transfer the information between the processor and the external memory.

3. A memory interface according to claim 1, wherein the control means generates more than one control signal, which includes an INITIALIZATION signal to initialize the memory interface and circuit means responsive to the flip flop means and the INITIALIZATION signal to selectively generate the first time delay.

4. A memory interface according to claim 1, wherein said wait circuit includes latch means to selectively delay the reading of the external memory by one internal processor clock cycle in response to the logic state of the flip flop means and the INITIALIZATION signal.

5. A memory interface according to claim 4, wherein the control signal includes a data bus N signal to indicate the processor is able to receive information on the information transfer bus, a MEMORY ENABLE signal to indicate a memory access, and a WRITE ENABLE to indicate that data is available on the information transfer bus to be stored in the external memory.

* * * * *